(12) United States Patent
Titiano et al.

(10) Patent No.: US 8,327,158 B2
(45) Date of Patent: Dec. 4, 2012

(54) HARDWARE VOTING MECHANISM FOR ARBITRATING SCALING OF SHARED VOLTAGE DOMAIN, INTEGRATED CIRCUITS, PROCESSES AND SYSTEMS

(75) Inventors: Patrick C Titiano, Saint Laurent du Var (FR); Safwan Qasem, Nice (FR)

(73) Assignee: Texas Instruments Incorporated, Dallas, TX (US)

( * ) Notice: Subject to any disclaimer, the term of this patent is extended or adjusted under 35 U.S.C. 154(b) by 790 days.

(21) Appl. No.: 11/953,999

(22) Filed: Dec. 11, 2007

(65) Prior Publication Data

US 2008/0162770 A1 Jul. 3, 2008

(30) Foreign Application Priority Data

Nov. 29, 2007 (EP) ..................................... 07291425

(51) Int. Cl.
*G06F 1/26* (2006.01)
(52) U.S. Cl. ........................ 713/300; 713/310
(58) Field of Classification Search .................. 713/300, 713/310
See application file for complete search history.

(56) References Cited

U.S. PATENT DOCUMENTS

| | | | |
|---|---|---|---|
| 4,998,027 A * | 3/1991 | Mihara et al. ..................... 327/19 |
| 5,343,086 A * | 8/1994 | Fung et al. ....................... 327/63 |
| 6,137,188 A * | 10/2000 | Mitchell et al. ................. 307/29 |
| 6,448,672 B1 * | 9/2002 | Voegeli et al. ................... 307/52 |
| 6,952,748 B1 * | 10/2005 | Guerrero et al. ............... 710/113 |
| 7,036,028 B2 | 4/2006 | Zalesski |
| 7,080,267 B2 | 7/2006 | Gary et al. |
| 7,085,943 B2 | 8/2006 | Chun et al. |
| 7,111,178 B2 | 9/2006 | Rusu et al. |
| 7,111,179 B1 | 9/2006 | Girson et al. |
| 7,146,514 B2 | 12/2006 | Kaushik et al. |
| 7,305,569 B2 | 12/2007 | Reilly |
| 7,424,630 B2 * | 9/2008 | Horvath ......................... 713/300 |
| 7,426,648 B2 | 9/2008 | Lint et al. |
| 7,516,347 B2 * | 4/2009 | Kim et al. ....................... 713/324 |
| 2003/0115495 A1 * | 6/2003 | Rawson, III ................... 713/324 |
| 2005/0216643 A1 | 9/2005 | Munguia |
| 2006/0123251 A1 | 6/2006 | Nakajima et al. |
| 2008/0161071 A1 | 7/2008 | Sherman |
| 2009/0172424 A1 * | 7/2009 | Cai et al. ........................ 713/300 |
| 2009/0177903 A1 * | 7/2009 | Rozen et al. ................... 713/322 |
| 2010/0011233 A1 * | 1/2010 | Halepete et al. ............... 713/322 |

* cited by examiner

*Primary Examiner* — Kim Huynh
*Assistant Examiner* — Zahid Choudhury
(74) *Attorney, Agent, or Firm* — Wade J. Brady, III; Frederick J. Telecky, Jr.

(57) ABSTRACT

An electronic circuit includes processors (CPU1, CPU2) operable to make respective voltage requests (Vcpu1, Vcpu2), and a power management circuit (1470) having a controllable supply voltage output (VDD1) is coupled to said processors (CPU1, CPU2) and further has a voting circuit (4520) responsive to the voltage requests (Vcpu1, Vcpu2) and operable to automatically establish a function (Fct) of the respective voltage requests (Vcpu1, Vcpu2) to control the controllable supply voltage output (VDD1).

24 Claims, 20 Drawing Sheets

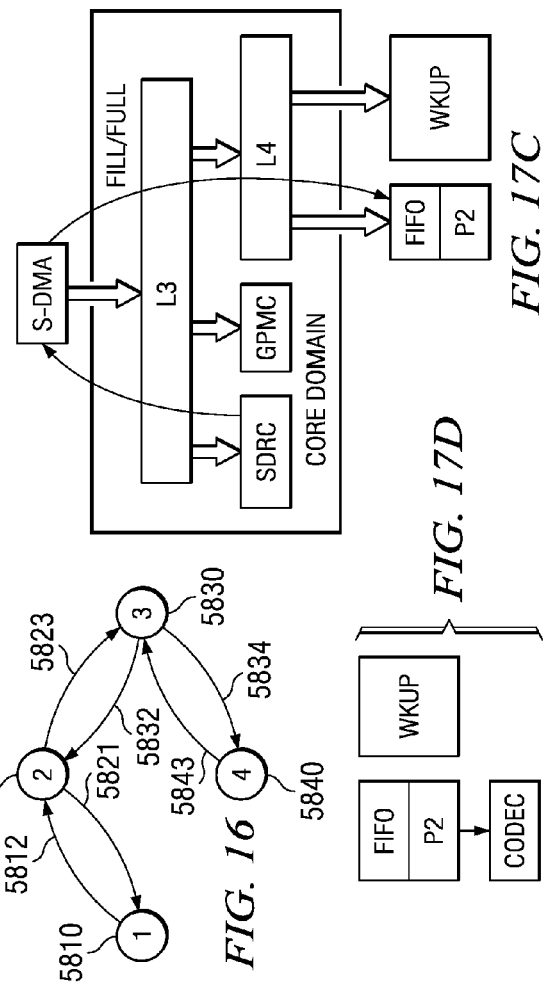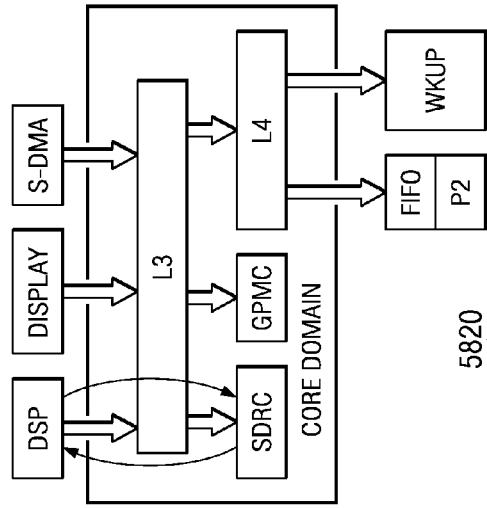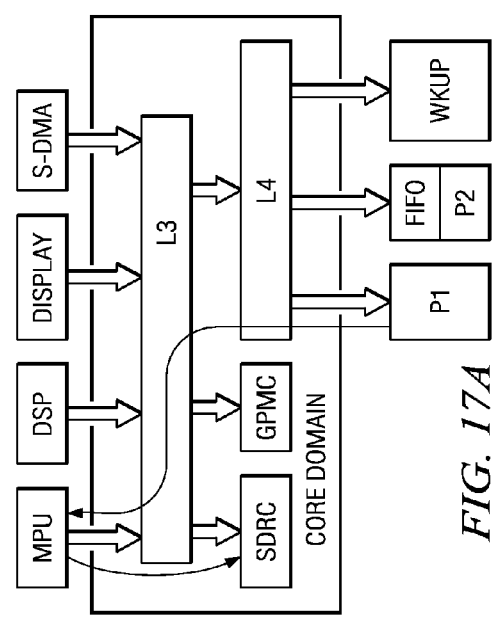

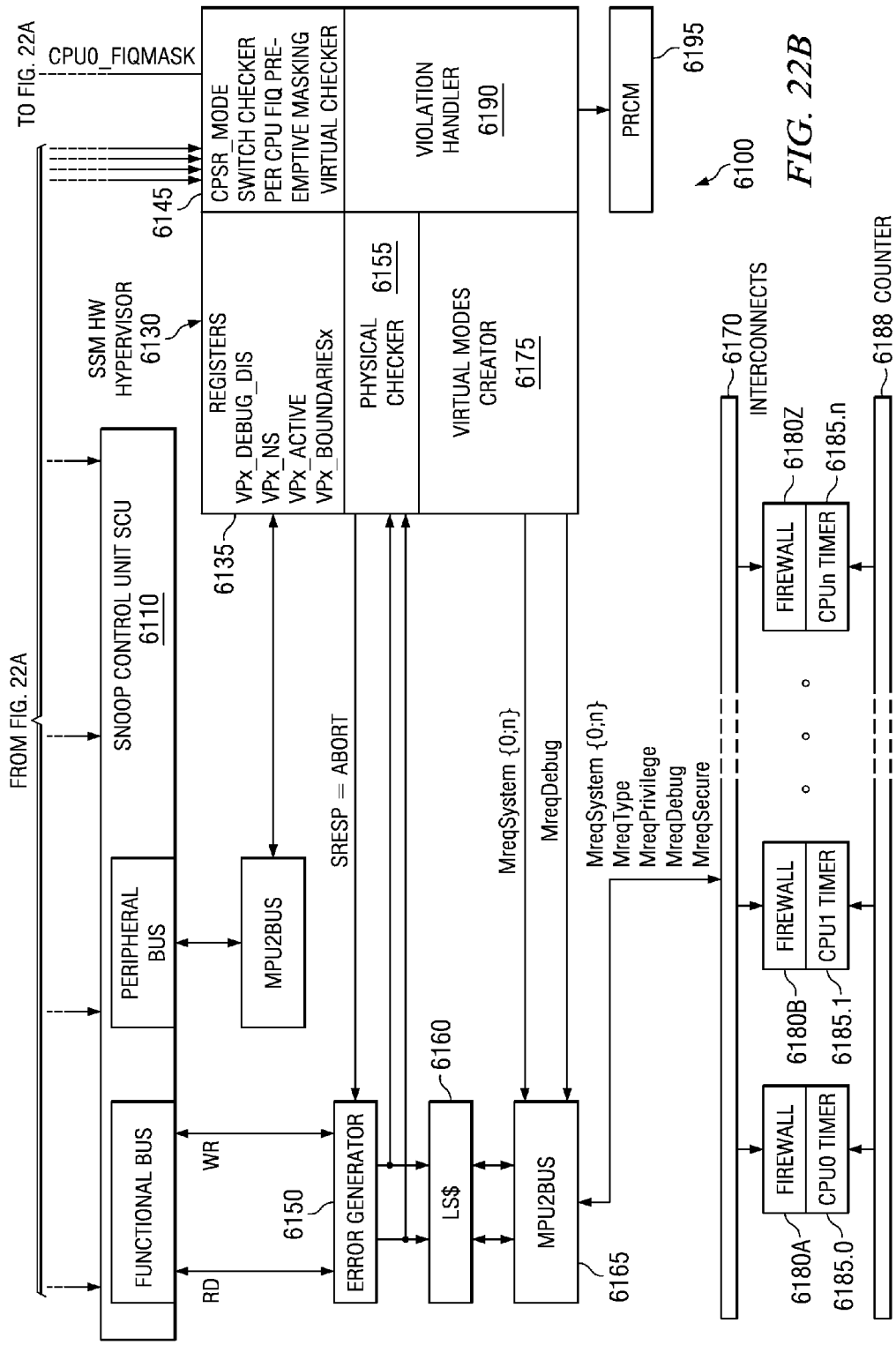

HARDWARE VOTING MECHANISM FOR ARBITRATING SCALING OF SHARED VOLTAGE DOMAIN, INTEGRATED CIRCUITS, PROCESSES AND SYSTEMS

CROSS-REFERENCE TO RELATED APPLICATIONS

This application is related to European patent application No. 06291710.9/EP06291710 filed Nov. 1, 2006, and European patent application No. 07291425.2/EP07291425.2 filed Nov. 29, 2007, and Paris Convention priority is claimed under 35 U.S.C. 119 and/or all other applicable law.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND OF THE INVENTION

This invention is in the field of electronic computing hardware and software and communications, and is more specifically directed to improved circuits, devices, and systems for power management and information and communication processing, and processes of operating and making them. Without limitation, the background is further described in connection with communications processing.

Wireline and wireless communications, of many types, have gained increasing popularity in recent years. The personal computer with a wireline modem such as DSL (digital subscriber line) modem or cable modem communicates with other computers over networks. The mobile wireless (or cellular) telephone has become ubiquitous around the world. Mobile telephony has recently begun to communicate video and digital data, and voice over packet (VoP or VoIP), in addition to cellular voice. Wireless modems for communicating computer data over a wide area network are also available.

Mobile video on cellular telephones and other mobile platforms is increasing in popularity. It is desirable that many streams of information such as video, voice and data should be flexibly handled by such mobile devices and platforms under power management.

Wireless data communications in wireless mesh networks, such as those operating according to the IEEE 802.16 standard or "WiMax," are increasing over a widening installed base of installations. The wireless mesh networks offer wideband multi-media transmission and reception that also appear to call for substantial computing power and hardware. Numerous other wireless technologies exist and are emerging about which various burdens and demands for power management exist and will arise.

Security techniques are used to improve the security of retail and other business commercial transactions in electronic commerce and to improve the security of communications wherever personal and/or commercial privacy is desirable. Security is important in both wireline and wireless communications and apparently imposes still further demands for computing power and hardware and compatible power management.

Processors of various types, including DSP (digital signal processing) chips, RISC (reduced instruction set computing), information storage memories and/or other integrated circuit blocks and devices are important to these systems and applications. Efficient power management that contains or reduces energy dissipation and the cost of manufacture and offers a variety of circuit and system products with performance features for different market segments is desirable in DSPs, integrated circuits generally and system-on-a-chip (SOC) design.

Further advantageous solutions and alternative solutions would, accordingly, be desirable in the art.

SUMMARY OF THE INVENTION

Generally and in one form of the invention, an electronic circuit includes processors operable to make respective voltage requests and a power management circuit having a controllable supply voltage output coupled to the processors and further having a voting circuit responsive to the voltage requests and operable to automatically establish a function of the respective voltage requests to control the controllable supply voltage output.

Generally and in another form of the invention, an electronic circuit includes processors operable to output respective voltage requests, a voltage supply having a controllable voltage supply output coupled to the processors, and a voting circuit having respective inputs coupled to the processors, the voting circuit having a voltage control output coupled to the voltage supply, the voting circuit operable in response to the respective inputs to automatically scale the controllable voltage supply output from the power supply substantially to the highest of the voltage requests.

Generally and in a further form of the invention, an electronic circuit includes a set of processors that use a shared resource for operation of the set of processors, the shared resource having a plurality of resource levels, a set of shared resource control registers coupled to the set of processors, at least two of the shared resource control registers operable to store respective multi-bit values representing respectively requested levels among the plurality of resource levels, the processors each operable to supply a respective multi-bit value to at least one of the corresponding shared resource control registers, and an arbitrating circuit coupled to the shared resource control registers and responsive to output a multi-bit value representing an arbitrated resource level of the shared resource.

Generally and in yet another form of the invention, a telecommunication apparatus includes a modem, a set of processors that use a shared resource for operation of the set of processors, the shared resource having a plurality of resource levels, the modem coupled to at least one of the processors, a set of shared resource control registers coupled to the set of processors, at least two of the shared resource control registers operable to store respective multi-bit values representing respectively requested levels among the plurality of resource levels, the processors each operable to supply a respective multi-bit value to at least one of the corresponding shared resource control registers, an arbitrating circuit coupled to the shared resource control registers and responsive to output a multi-bit value representing an arbitrated resource level of the shared resource, a scalable resource controller responsive to the arbitrating circuit to deliver the shared resource to the set of processors at substantially the arbitrated resource level of the shared resource represented by the multi-bit value output from the arbitrating circuit, and a user interface coupled to the modem and to at least one of the processors.

Generally and in still another form of the invention, a process of manufacturing an electronic circuit includes fabricating a set of processors coupled to respective resource control registers responsive to multi-bit resource requests from the processors together with an arbitrating circuit responsive to the shared resource control registers to output a multi-bit value representing an arbitrated resource level.

Generally and in another further form of the invention, a power management process for supplying a controllable voltage for first and second processors includes operating each processor to make respective voltage requests and arbitrating the voltage requests to automatically control the controllable voltage to establish the highest magnitude of the respective voltage requests.

These and other circuit, device, system, apparatus, process, and other forms of the invention are disclosed and claimed.

BRIEF DESCRIPTION OF THE DRAWINGS

FIG. 16 is a state transition diagram of inventive power management operational process of an inventive integrated circuit with various portions of the integrated circuit powered and unpowered as illustrated in FIGS. 17A-17D.

FIGS. 17A-17D depict an inventive process sequence of various portions of the same inventive integrated circuit of FIG. 3, wherein any given portion of the integrated circuit is shown when powered and not shown when unpowered, wherein the sequence is correspondingly illustrated in the inventive state transition diagram of FIG. 16.

FIGS. 22A and 22B are two halves of a composite diagram of an inventive quad-core multi-processing system combination having inventive power management herein.

Corresponding numerals in different figures indicate corresponding parts except where the context indicates otherwise. An index i refers to any particular one of several elements having designators or numerals suffixed with different values of a numerical suffix to which the index i refers. Corresponding designations differing by upper and lower case indicate corresponding parts except where the context indicates otherwise.

DETAILED DESCRIPTION OF EMBODIMENTS

Figure 1:
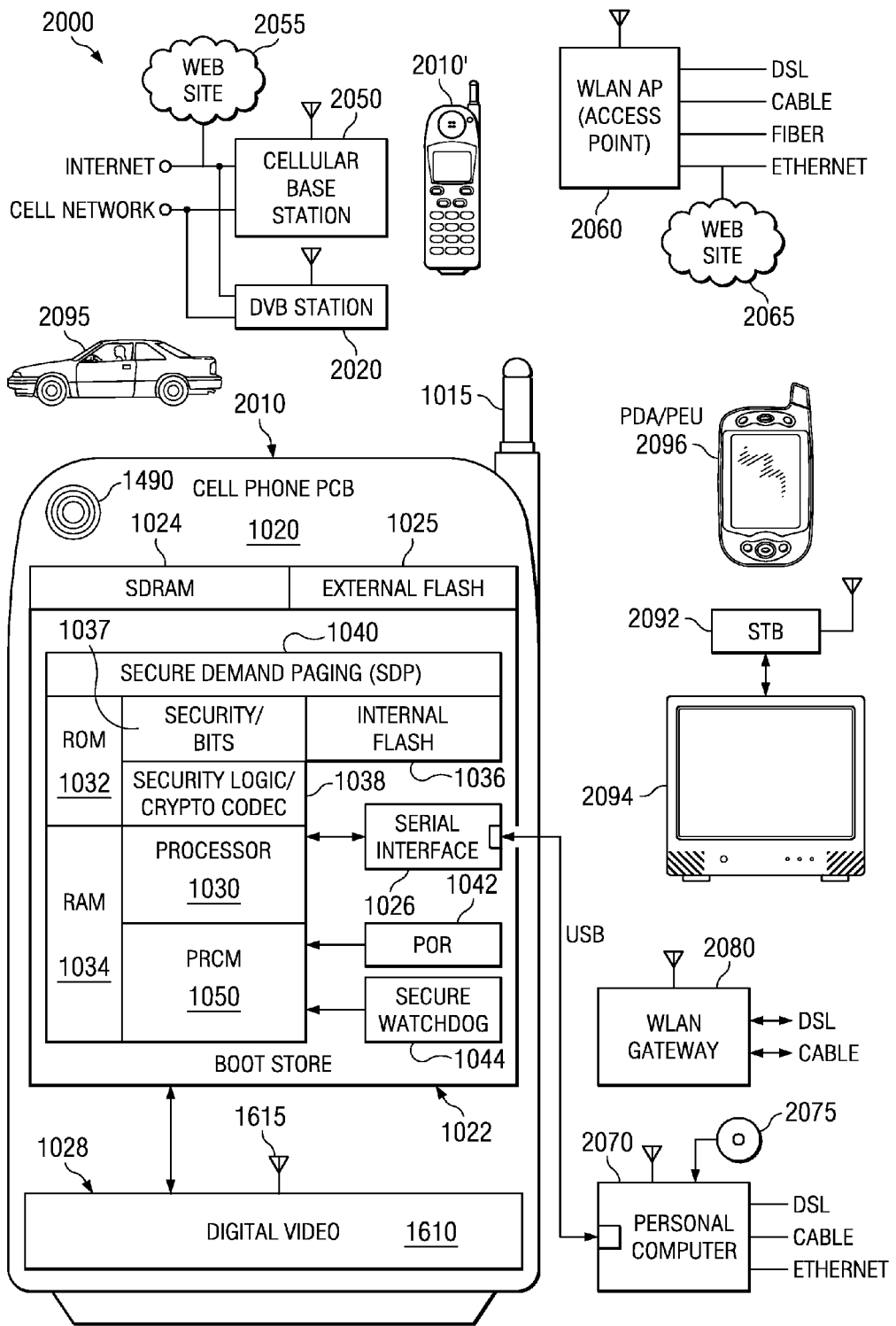
FIG. 1 is a pictorial diagram of a communications system embodiment including system blocks, for example a cellular base station, a DVB video station, a WLAN AP (wireless local area network access point), a WLAN gateway, a personal computer, a set top box and television unit, and two cellular telephone handsets, any one, some or all of the foregoing improved according to the invention.

In FIG. 1, an improved communications system 2000 has system blocks as described next and improved with any one, some or all of the circuits and subsystems shown in FIGS. 1-22B. Any or all of the system blocks, such as cellular mobile telephone and data handsets 2010 and 2010', a cellular (telephony and data) base station 2050, a WLAN AP (wireless local area network access point, IEEE 802.11 or otherwise) 2060, a Voice over WLAN gateway 2080 with user voice over packet telephone 2085 (not shown), and a voice enabled personal computer (PC) 2070 with another user voice over packet telephone (not shown), communicate with each other in communications system 2000. Each of the system blocks 2010, 2010', 2050, 2060, 2070, 2080 are provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), premises power wiring, fiber (fiber optic cable to premises), and Ethernet wideband network. Cellular base station 2050 two-way communicates with the handsets 2010, 2010', with the Internet, with cellular communications networks and with PSTN (public switched telephone network).

In this way, advanced networking capability for services, software, and content, such as cellular telephony and data, audio, music, voice, video, e-mail, gaming, security, e-commerce, file transfer and other data services, internet, world wide web browsing, TCP/IP (transmission control protocol/Internet protocol), voice over packet and voice over Internet protocol (VoP/VoIP), and other services accommodates and provides security for secure utilization and entertainment appropriate to the just-listed and other particular applications.

The embodiments, applications and system blocks disclosed herein are suitably implemented in fixed, portable, mobile, automotive, seaborne, and airborne, communications, control, set top box 2092, television 2094 (receiver or two-way TV), and other apparatus. The personal computer (PC) 2070 is suitably implemented in any form factor such as desktop, laptop, palmtop, organizer, mobile phone handset, PDA personal digital assistant 2096, internet appliance, wearable computer, content player, personal area network, or other type.

For example, handset 2010 is improved for selectively determinable functionality, performance, security and economy when manufactured. Handset 2010 is interoperable and able to communicate with all other similarly improved and unimproved system blocks of communications system 2000. Camera 1490 provides video pickup for cell phone 1020 to send over the internet to cell phone 2010', PDA 2096, TV 2094, and to a monitor of PC 2070 via any one, some or all of cellular base station 2050, DVB station 2020, WLAN AP 2060, STB 2092, and WLAN gateway 2080. Handset 2010 has a video storage, such as hard drive, high density memory, and/or compact disk (CD) in the handset for digital video recording (DVR) such as for delayed reproduction, transcoding, and retransmission of video to other handsets and other destinations.

On a cell phone printed circuit board (PCB) 1020 in handset 2010, is provided a higher-security processor integrated circuit 1022, an external flash memory 1025 and SDRAM 1024, and a serial interface 1026. Serial interface 1026 is suitably a wireline interface, such as a USB interface connected to a flash drive or by a USB line to the personal computer 1070 and magnetic and/or optical media 2075 when the user desires and for reception of software intercommunication and updating of information between the personal computer 2070 (or other originating sources external to the handset 2010) and the handset 2010. Such intercommunication and updating also occur via a processor in the cell phone 2010 itself such as for cellular modem, WLAN, Bluetooth from a website 2055 or 2065, or other circuitry 1028 for wireless or wireline modem processor, digital television and physical layer (PHY).

In FIG. 1, processor integrated circuit 1022 includes at least one processor (or central processing unit CPU) block 1030 coupled to an internal (on-chip read-only memory) ROM 1032, an internal (on-chip random access memory) RAM 1034, and an internal (on-chip) flash memory 1036. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to processor 1030. A device-unique security key is suitably also provided in the E-fuses or downloaded to other non-volatile, difficult-to-alter parts of the cell phone unit 1010.

The words "internal" and "external" as applied to a circuit or chip respectively refer to being on-chip or off-chip of the applications processor chip 1022. All items are assumed to be internal to an apparatus (such as a handset, base station, access point, gateway, PC, or other apparatus) except where the words "external to" are used with the name of the apparatus, such as "external to the handset."

ROM 1032 provides a boot storage having boot code that is executable in at least one type of boot sequence. One or more of RAM 1034, internal flash 1036, and external flash 1024 are also suitably used to supplement ROM 1032 for boot storage purposes.

Figure 2:
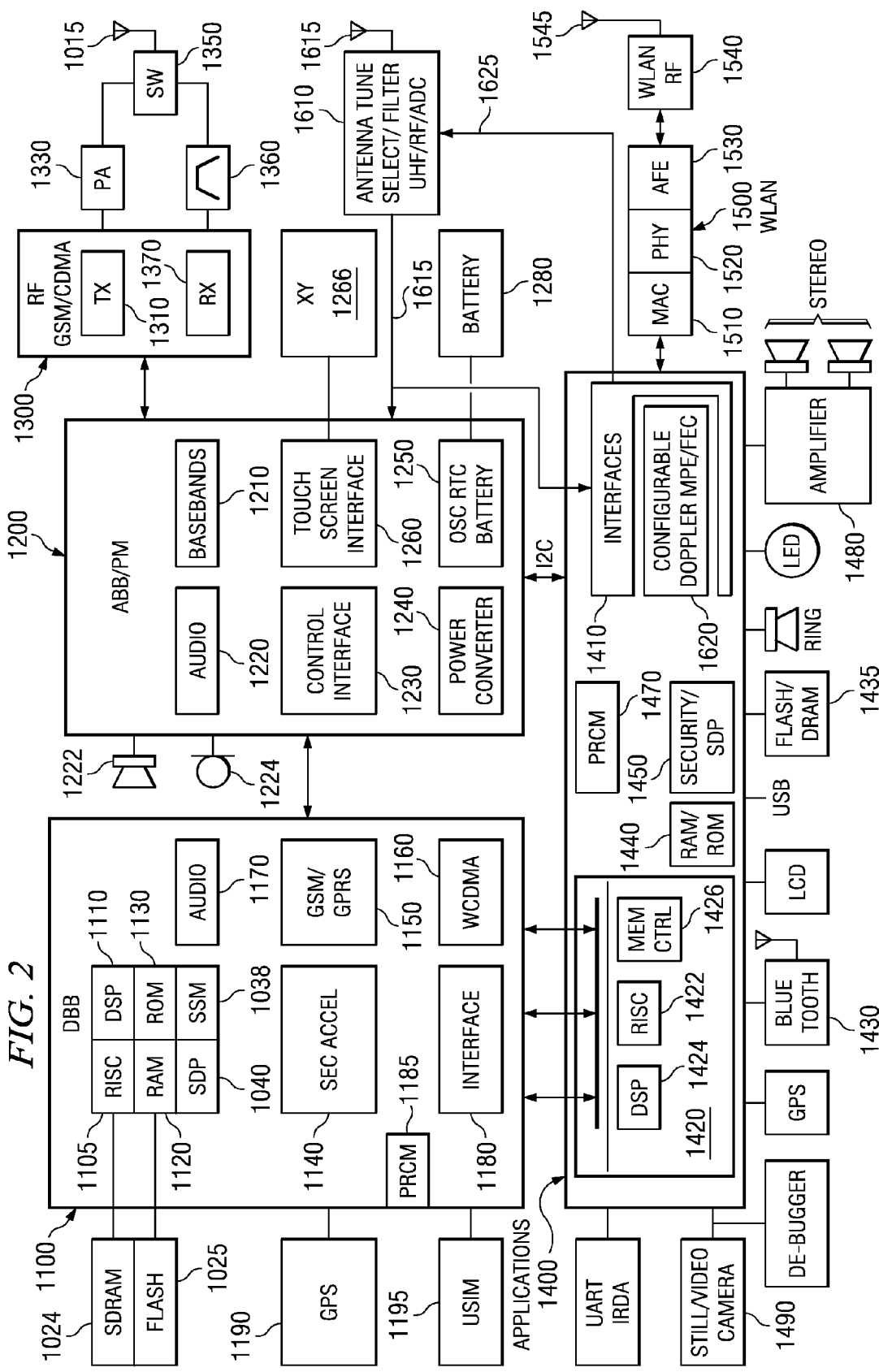
FIG. 2 is a block diagram of inventive integrated circuit chips for use in the blocks of the communications system of FIG. 1, including an inventive partitioning of circuit blocks of a cellular telephone handset.

FIG. 2 illustrates inventive integrated circuit chips including chips 1100, 1200, 1300, 1400, 1500, 1600 for use in the blocks of the communications system 2000 of FIG. 1. The skilled worker uses and adapts the integrated circuits to the particular parts of the communications system 2000 as appropriate to the functions intended. For conciseness of description, the integrated circuits are described with particular reference to use of all of them in the cellular telephone handsets 2010 and 2010' by way of example.

It is contemplated that the skilled worker uses each of the integrated circuits shown in FIG. 2, or such selection from the complement of blocks therein provided into appropriate other integrated circuit chips, or provided into one single integrated circuit chip, in a manner optimally combined or partitioned between the chips, to the extent needed by any of the applications supported by the cellular telephone base station 2050, personal computer(s) 2070 equipped with WLAN, WLAN access point 2060 and Voice WLAN gateway 2080, as well as cellular telephones, radios and televisions, Internet audio/video content players, fixed and portable entertainment units, routers, pagers, personal digital assistants (PDA), organizers, scanners, faxes, copiers, household appliances, office appliances, microcontrollers coupled to controlled mechanisms for fixed, mobile, personal, robotic and/or automotive use, combinations thereof, and other application products now known or hereafter devised for increased, partitioned or selectively determinable advantages.

In FIG. 2, an integrated circuit 1100 includes a digital baseband (DBB) block 1110 that has a RISC processor 1105 (such as MIPS core(s), ARM core(s), or other suitable processor) and a digital signal processor 1110 such as from the TMS320C55x™ DSP generation from Texas Instruments Incorporated or other digital signal processor (or DSP core) 1110, communications modem software and security software for any such processor or core, security accelerators 1140, and a memory controller. Security accelerators block 1140 provide additional computing power such as for hashing and encryption that are accessible, for instance, when the integrated circuit 1100 is operated in a security level enabling the security accelerators block 1140 and affording types of access to the security accelerators depending on the security level and/or security mode. The memory controller interfaces the RISC core 1105 and the DSP core 1110 to Flash memory 1025 and SDRAM 1024 (synchronous dynamic random access memory). On chip RAM 1120 and on-chip ROM 1130 also are accessible to the processors 1110 for providing sequences of software instructions and data thereto. A security logic circuit 1038 of FIGS. 1-3 has a secure state machine (SSM) 2460 to provide hardware monitoring of any tampering with security features. A Secure Demand Paging (SDP) circuit 1040 is provided for effectively-extended secure memory.

Digital circuitry 1150 on integrated circuit 1100 supports and provides wireless modem interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via an analog baseband chip 1200 and GSM/CDMA transmit/receive chip 1300. Digital circuitry 1150 includes a ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1xEV-DV, 1xEV-DO or 3xEV-DV) data feature via the analog baseband chip 1200 and RF GSM/CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing.). Blocks for uplink and downlink processes of WCDMA are provided.

Audio/voice block 1170 supports audio and voice functions and user interfacing. Speech/voice codec(s) are suitably provided in memory space in audio/voice block 1170 for processing by processor(s) 1110. An applications interface block 1180 couples the digital baseband chip 1100 to an applications processor 1400. Also, a serial interface in block 1180 interfaces from parallel digital busses on chip 1100 to USB (Universal Serial Bus) of PC (personal computer) 2070. The serial interface includes UARTs (universal asynchronous receiver/transmitter circuit) for performing the conversion of data between parallel and serial lines. A power resets and control module PRCM 1185 provides power management circuitry for chip 1100. Chip 1100 is coupled to location-determining circuitry 1190 for GPS (Global Positioning System). Chip 1100 is also coupled to a USIM (UMTS Subscriber Identity Module) 1195 or other SIM for user insertion of an identifying plastic card, or other storage element, or for sensing biometric information to identify the user and activate features.

In FIG. 2, a mixed-signal integrated circuit 1200 includes an analog baseband (ABB) block 1210 for GSM/GPRS/EDGE/UMTS/HSDPA/HSUPA which includes SPI (Serial Port Interface), digital-to-analog/analog-to-digital conversion DAC/ADC block, and RF (radio frequency) Control pertaining to GSM/GPRS/EDGE/UMTS/HSDPA/HSUPA and coupled to RF (GSM etc.) chip 1300. Block 1210 suitably provides an analogous ABB for CDMA wireless and any associated 1xEV-DV, 1xEV-DO or 3xEV-DV data and/or voice with its respective SPI (Serial Port Interface), digital-to-analog conversion DAC/ADC block, and RF Control pertaining to CDMA and coupled to RF (CDMA) chip 1300.

An audio block 1220 has audio I/O (input/output) circuits to a speaker 1222, a microphone 1224, and headphones (not shown). Audio block 1220 has an analog-to-digital converter (ADC) coupled to the voice codec and a stereo DAC (digital to analog converter) for a signal path to the baseband block 1210 including audio/voice block 1170, and with suitable encryption/decryption activated.

A control interface 1230 has a primary host interface (I/F) and a secondary host interface to DBB-related integrated circuit 1100 of FIG. 2 for the respective GSM and CDMA paths. The integrated circuit 1200 is also interfaced to an I2C port of applications processor chip 1400 of FIG. 2. Control interface 1230 is also coupled via circuitry to interfaces in circuits 1250 and the baseband 1210.

A power conversion block 1240 includes buck voltage conversion circuitry for DC-to-DC conversion, and low-dropout (LDO) voltage regulators for power management/sleep mode of respective parts of the chip regulated by the LDOs. Power conversion block 1240 provides information to and is responsive to a power control state machine between the power conversion block 1240 and circuits 1250.

Circuits 1250 provide oscillator circuitry for clocking chip 1200. The oscillators have frequencies determined by one or more crystals. Circuits 1250 include a RTC real time clock (time/date functions), general purpose I/O, a vibrator drive (supplement to cell phone ringing features), and a USB On-The-Go (OTG) transceiver. A touch screen user interface 1260 is coupled to a touch screen XY 1266 off-chip.

Batteries such as a lithium-ion battery 1280 and backup battery provide power to the system and battery data to circuit 1250 on suitably provided separate lines from the battery pack. When needed, the battery 1280 also receives charging current from a Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine. Battery monitoring is provided by either or both of 1-Wire and/or an interface called HDQ.

In FIG. 2 an RF integrated circuit 1300 includes a GSM/GPRS/EDGE/UMTS/CDMA RF transmitter block 1310 supported by oscillator circuitry with off-chip crystal (not shown). Transmitter block 1310 is fed by baseband block 1210 of chip 1200. Transmitter block 1310 drives a dual band RF power amplifier (PA) 1330. On-chip voltage regulators maintain appropriate voltage under conditions of varying power usage. Off-chip switchplexer 1350 couples wireless antenna and switch circuitry to both the transmit portion 1310, 1330 and the receive portion next described. Switchplexer 1350 is coupled via band-pass filters 1360 to receiving LNAs (low noise amplifiers) for 850/900 MHz, 1800 MHz, 1900 MHz and other frequency bands as appropriate. Depending on the band in use, the output of LNAs couples to GSM/GPRS/EDGE/UMTS/CDMA demodulator 1370 to produce the I/Q or other outputs thereof (in-phase, quadrature) to the GSM/GPRS/EDGE/UMTS/CDMA baseband block 1210.

Further in FIG. 2, an integrated circuit chip or core 1400 is provided for applications processing and more off-chip peripherals. Chip (or core) 1400 has interface circuit 1410 including a high-speed WLAN 802.11a/b/g interface coupled to a WLAN chip 1500. Further provided on chip 1400 is an applications processing section 1420 which includes a RISC processor 1422 (such as MIPS core(s), ARM core(s), or other suitable processor), a digital signal processor (DSP) 1424 such as from the TMS320C55x™ DSP generation and/or the TMS320C6x™ DSP generation from Texas Instruments Incorporated or other digital signal processor(s), and a shared memory controller MEM CTRL 1426 with DMA (direct memory access), and a 2D (two-dimensional display) graphic accelerator. Speech/voice codec functionality is suitably processed in chip 1400, in chip 1100, or both chips 1400 and 1100.

The RISC processor 1422 and the DSP 1424 in section 1420 have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, the shared memory controller 1426 in circuitry 1420 interfaces the RISC processor 1420 and the DSP 1424 via an on-chip bus to on-chip memory 1440 with RAM and ROM. A 2D graphic accelerator is coupled to frame buffer internal SRAM (static random access memory) in block 1440. A security block 1450 in security logic 1038 of FIG. 1 includes an SSM analogous to SSM 1038, and includes secure hardware accelerators having security features and provided for secure demand paging 1040 as further described herein and for accelerating encryption and decryption. A random number generator RNG is provided in security block 1450. Among the Hash approaches are SHA-1 (Secured Hashing Algorithm), MD2 and MD5 (Message Digest version #). Among the symmetric approaches are DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography). The security features contemplated include any of the foregoing hardware and processes and/or any other known or yet to be devised security and/or hardware and encryption/decryption processes implemented in hardware or software.

Security logic 1038 of FIG. 1 and FIG. 2 (1038, 1450) includes hardware-based protection circuitry, also called security monitoring logic or a secure state machine SSM. Security logic 1038 (1450) is coupled to and monitors busses and other parts of the chip for security violations and protects and isolates the protected areas. Security logic 1038 (1450) makes secure ROM space inaccessible, makes secure RAM and register space inaccessible and establishes any other appropriate protections to additionally foster security. In one embodiment such a software jump from Flash memory 1025 (1435) to secure ROM, for instance, causes a security violation wherein, for example, the security logic 1038 (1450) produces an automatic immediate reset of the chip. In another embodiment, such a jump causes the security monitoring logic 1038, (1450) to produce an error message and a re-vectoring of the jump away from secure ROM. Other security violations would include attempted access to secure register or RAM space.

On-chip peripherals and additional interfaces 1410 include UART data interface and MCSI (Multi-Channel Serial Interface) voice wireless interface for an off-chip IEEE 802.15 (Bluetooth and low and high rate piconet and personal network communications) wireless circuit 1430. Debug messaging and serial interfacing are also available through the UART. A JTAG emulation interface couples to an off-chip emulator Debugger for test and debug. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls, and a multi-channel buffered serial port (McBSP) for data. Timers, interrupt controller, and RTC (real time clock) circuitry are provided in chip 1400. Further in interface 1410 are a MicroWire (u-wire 4 channel serial port) and multi-channel buffered serial port (McBSP) to Audio codec, a touch-screen controller, and interface to an audio amplifier 1480 to stereo speakers.

External audio content and touch screen (in/out) and LCD (liquid crystal display), organic semiconductor display, and DLP™ digital light processor display from Texas Instruments Incorporated, are suitably provided in various embodiments and coupled to interface 1410. In vehicular use, the display is suitably any of these types provided in the vehicle, and sound is provided through loudspeakers, headphones or other audio transducers provided in the vehicle. In some vehicles a transparent organic semiconductor display 2095 of FIG. 1 is provided on one or more windows of the vehicle and wirelessly or wireline-coupled to the video feed.

Interface 1410 additionally has an on-chip USB OTG interface couples to off-chip Host and Client devices. These USB communications are suitably directed outside handset 1010 such as to PC 1070 (personal computer) and/or from PC 1070 to update the handset 2010.

An on-chip UART/IrDA (infrared data) interface in interfaces 1410 couples to off-chip GPS (global positioning system block cooperating with or instead of GPS 1190) and Fast IrDA infrared wireless communications device. An interface provides EMT9 and Camera interfacing to one or more off-chip still cameras or video cameras 1490, and/or to a CMOS sensor of radiant energy. Such cameras and other apparatus all have additional processing performed with greater speed and efficiency in the cameras and apparatus and in mobile devices coupled to them with improvements as described herein. Further in FIG. 2, an on-chip LCD controller or DLP™ controller and associated PWL (Pulse-Width Light) block in interfaces 1410 are coupled to a color LCD display or DLP™ display and its LCD light controller off-chip and/or DLP™ digital light processor display.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

In FIG. 2, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for Barker coding, CCK, and OFDM. PHY 1520 receives PHY Clocks from a clock generation block supplied with suitable off-chip host clock, such as at 13, 16.8, 19.2, 26, or 38.4 MHz. These clocks are compatible with cell phone systems and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver, or otherwise, and power amplifier and has a low noise amplifier LNA in the receive path. Bandpass filtering couples WLAN RF 1540 to a WLAN antenna. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). A security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 2.

Still other additional wireless interfaces such as for wideband wireless such as IEEE 802.16 WiMAX mesh networking and other standards are suitably provided and coupled to the applications processor integrated circuit 1400 and other processors in the system. WiMax has MAC and PHY processes and the illustration of blocks 1510 and 1520 for WLAN indicates the relative positions of the MAC and PHY blocks for WiMax.

In FIG. 2, a further digital video integrated circuit 1610 is coupled with a television antenna 1615 (and/or coupling circuitry to share antenna 1015 and/or 1545) to provide television antenna tuning, antenna selection, filtering, and RF input stage for recovering video/audio/controls from television transmitter (e.g., DVB station 2020 of FIG. 1). Digital video integrated circuit 1610 in some embodiments has an integrated analog-to-digital converter ADC on-chip, and in some other embodiments feeds analog to ABB chip 1200 for conversion by an ADC on ABB chip 1200. The ADC supplies a digital output to interfaces 1410 of applications processor chip 1400 either directly from chip 1610 or indirectly from chip 1610 via the ADC on ABB chip 1200. Applications processor chip 1400 includes a digital video block 1620 coupled to interface 1410 and having a configurable adjustable shared-memory telecommunications signal processing chain such as Doppler/MPE-FEC. See incorporated patent application TI-62445, "Flexible And Efficient Memory Utilization For High Bandwidth Receivers, Integrated Circuits, Systems, Methods And Processes Of Manufacture" Ser. No. 11/733,831 filed Apr. 11, 2007, which is hereby incorporated herein by reference. A processor on chip 1400 such as RISC processor 1422 and/or DSP 1424 configures, supervises and controls the operations of the digital video block 1620.

TABLE 1 provides a list of some of the abbreviations used in this document.

TABLE 1

GLOSSARY OF SELECTED ABBREVIATIONS

| | |
|---|---|
| ACK | Acknowledge |
| AVS | Adaptive Voltage Scaling |
| BIOS | Basic Input Output System |
| CLK | Clock |
| CM | Clock Manager |
| CC | Clock Controller |
| COPR | Coprocessor (skewed pipe or other auxiliary processor) |
| DFF | D-Flipflop |
| DMA | Direct Memory Access |
| DPLL | Digital Phase Locked Loop |
| DPS | Dynamic Power Switching |
| DSP | Digital Signal Processor |
| DVFS | Dynamic Voltage Frequency Scaling |
| D2D | Device to Device |
| EMI | Energy Management Interface |
| FIFO | First In First Out (queue) |
| FSM | Finite State Machine |
| GFX | Graphics Engine |
| GPMC | General Purpose Memory Controller |
| HLOS | High Level Operating System |
| INTC | Interrupt Controller |
| IVA | Imaging, Video and Audio processor |
| LDO | Low Drop Out regulator. |
| L1$, L2$ | Level 1, Level 2 Cache |
| LS | Level Shifter |
| MEM | Memory |
| MPU | Microprocessor Unit |
| OCP | Open Core Protocol bus protocol |
| OPP | Operating Performance Point |

TABLE 1-continued

GLOSSARY OF SELECTED ABBREVIATIONS

| | |
|---|---|
| PLL | Phase Lock Loop |
| POR | Power On Reset |
| PRCM | Power Reset and Clock Manager |
| PRM | Power & Reset Manager |
| P1, P2 | Peripheral domain, $1^{st}$ or $2^{nd}$. |
| REQ | Request |
| RISC | Reduced Instruction Set Computer |
| RTOS | Real Time Operating System |
| SDRAM | Synchronous Dynamic Random Access Memory |
| SDRC | SDRAM Refresh Controller |
| SGX | Graphics engine |
| SLM | Static Leakage Management |
| SMPS | Switch Mode Power Supply |
| SMS | SDRAM Memory Scheduler |
| SR | Sensor Error unit |
| SRAM | Static Random Access Memory |
| SSM | Secure State Machine |
| UART | Universal Asynchronous Receiver Transmitter (2-way serial interface) |
| VCON | Voltage Controller |
| VDD | Supply Voltage |
| VP | Voltage Processor |
| WDT | Watchdog Timer |
| WKUP | Wakeup |

Figure 3:
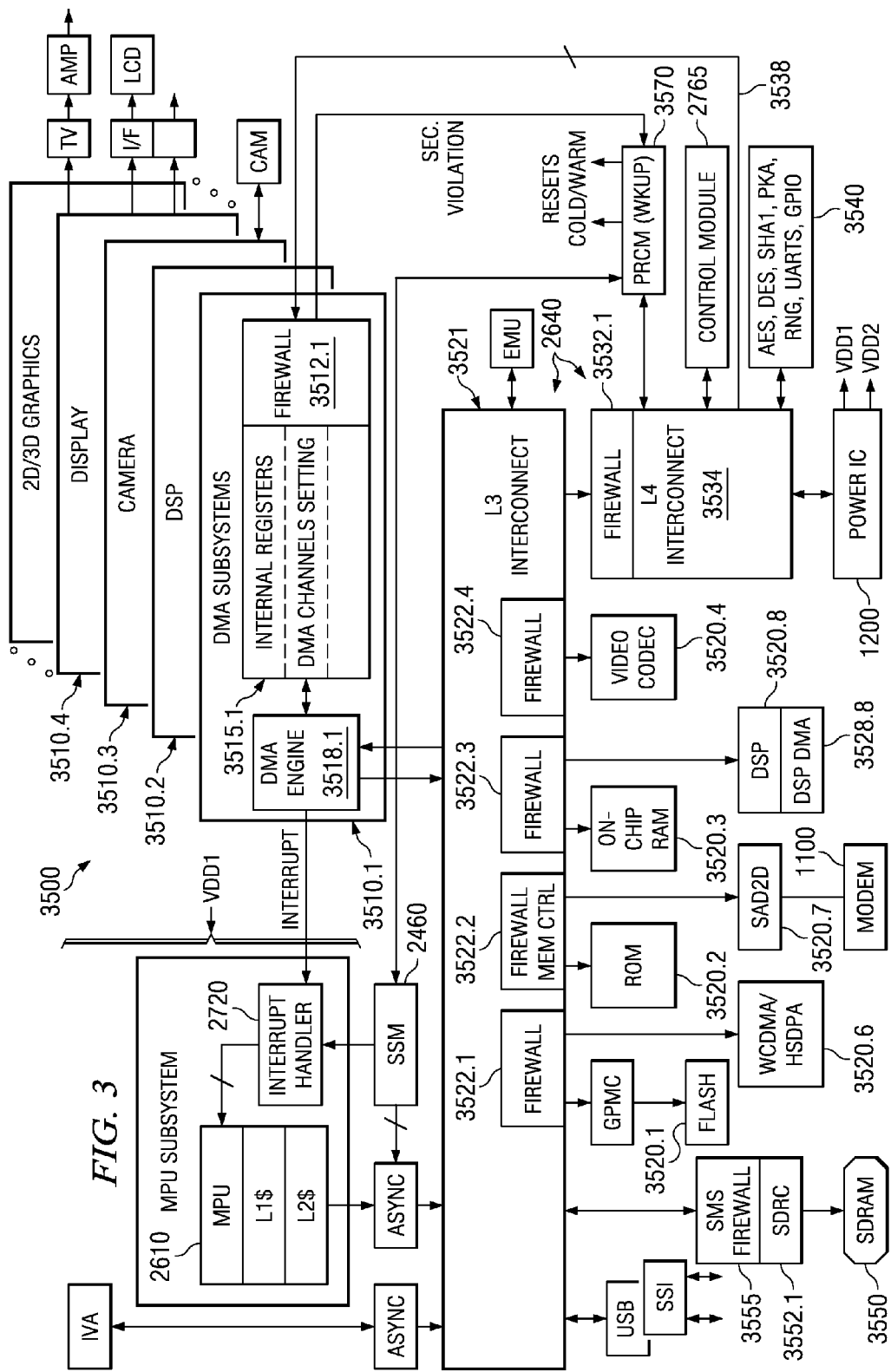
FIG. 3 is a block diagram of an inventive applications processor integrated circuit in FIG. 2 with associated integrated circuits.

In FIG. 3, a system 3500 has an MPU subsystem, an IVA subsystem, and DMA subsystems 3510.*i*. The MPU subsystem suitably has one or more processors with CPUs such as RISC or CISC processors 2610, and having superscalar processor pipeline(s) with L1 and L2 caches. The IVA subsystem has one or more DSPs for image processing, video processing, and audio processing. The IVA subsystem has L1 and L2 caches, RAM and ROM, and hardware accelerators as desired such as for motion estimation, variable length codec, and other processing. DMA is integrated into the system 3500 in such a way that it can perform target accesses via target firewalls 3522.*i* and 3512.*i* of FIG. 3 connected on interconnects 2640. A target is a circuit block targeted or accessed by another circuit block operating as an initiator. In order to perform such accesses the DMA channels in DMA subsystems 3510.*i* are programmed. Each DMA channel specifies the source location of the Data to be transferred from an initiator and the destination location of the Data for a target.

Data exchange between a peripheral subsystem and a memory subsystem and general system transactions from memory to memory are handled by the System SDMA 3510.1. Data exchanges within a DSP subsystem 3510.2 are handled by the DSP DMA 3518.2. Data exchange to store camera capture is handled using a Camera DMA 3518.3 in camera subsystem CAM 3510.3. The CAM subsystem 3510.3 suitably handles one or two camera inputs of either serial or parallel data transfer types, and provides image capture hardware image pipeline and preview. Data exchange to refresh a display is handled in a display subsystem 3510.4 using a DISP DMA 3518.4 (numeral omitted). This subsystem 3510.4, for instance, includes a dual output three layer display processor for 1×Graphics and 2×Video, temporal dithering (turning pixels on and off to produce grays or intermediate colors) and SDTV to QCIF video format and translation between other video format pairs. The Display block 3510.4 feeds an LCD panel using either a serial or parallel interface. Also television output TV and Amp provide CVBS or S-Video output and other television output types.

A hardware security architecture including SSM 2460 propagates qualifiers on the interconnect 3521 and 3534 as shown in FIG. 3. The MPU 2610 issues bus transactions and sets some qualifiers on Interconnect 3521. SSM 2460 also provides one or more MreqSystem qualifiers. The bus transactions propagate through the L4 Interconnect 3534 and then reach a DMA Access Properties Firewall 3512.1. Transactions are coupled to a DMA engine 3518.*i* in each subsystem 3510.*i* which supplies a subsystem-specific interrupt to the Interrupt Handler 2720. Interrupt Handler 2720 is also fed one or more interrupts from SSM 2460. Interrupt Handler 2720 outputs interrupts for MPU 2610.

In FIG. 3, firewall protection by firewalls 3522.*i* is provided for various system blocks 3520.*i*, such as GPMC to Flash memory 3520.1, ROM 3520.2, on-chip RAM 3520.3, Video Codec 3520.4, WCDMA/HSDPA 3520.6, SAD2D 3520.7 to Modem chip 1100, and a DSP and DSP DMA 3528.8. A System Memory Interface SMS with SMS Firewall 3555 is coupled to SRAM Refresh Controller SDRC 3552.1 and to system SDRAM 3550.

Various initiators in the system are assigned multi-bit identifying codes designated ConnID. Each initiator generates its particular ConnID code on a bus in operation. For background on these initiators and identifiers, see for instance incorporated patent application TI-61985, "Virtual Cores And Hardware-Supported Hypervisor Integrated Circuits, Systems, Methods and Processes of Manufacture," Ser. No. 11/671,752, filed Feb. 6, 2007, which is hereby incorporated herein by reference.

Some Initiators and their buses in one example are Processor Core MPU 2610 [RD, WR, INSTR Buses], digital signal processor direct memory access DSP DMA 3510.2 [RD, WR], system direct memory access SDMA 3510.1 [RD, WR], Universal Serial Bus USB HS, virtual processor PROC_VIRTUAL [RD, WR, INSTR], virtual system direct memory access SDMA_VIRTUAL [RD, WR], display 3510.4 such as LCD, memory management for digital signal processor DSP MMU, camera CAMERA 3510.3 [CAMERA, MMU], and a secure debug access port to emulation block EMU.

The DMA channels support interconnect qualifiers collectively designated MreqInfo, such as MreqSecure, MreqPrivilege, MreqSystem in order to regulate access to different protected memory spaces. The system configures and generates these different access qualifiers in a security robust way and delivers them to hardware firewalls 3512.1, 3512.2, etc. and 3522.1, 3522.2, etc. associated with some or all of the targets. The improved hardware firewalls protect the targets according to different access rights of initiators. Some background on hardware firewalls is provided in incorporated patent application TI-38804, "Method And System For A Multi-Sharing Security Firewall," Ser. No. 11/272,532 filed Nov. 10, 2005, which is hereby incorporated herein by reference.

The DMA channels 3515.1, .2, etc. are configurable through the L4 Interconnect 3534 by the MPU 2610. A circuitry example provides a Firewall configuration on a DMA L4 Interconnect interface that restricts different DMA channels according to the configuration previously written to configuration register fields. This Firewall configuration implements hardware security architecture rules in place to allow and restrict usage of the DMA channel qualifiers used in attempted accesses to various targets.

When an attempt to configure access for DMA channels in a disallowed way is detected, in-band errors are sent back to the initiator that made the accesses and out-band errors are generated to the Control Module 2765 and converted into an MPU Interrupt. Some background on security attack detection and neutralization is described in the incorporated patent application TI-37338, "System and Method of Identifying and Preventing Security Violations Within a Computing System," Ser. No. 10/961,344 filed Oct. 8, 2004, which is hereby incorporated herein by reference.

In FIG. 3, the MPU 2610, Others block, and System DMA (SDMA) 3530.1, 3535.1 each supply or have some or all of the MreqInfo signals MreqSystem, MreqSecure, MreqPrivilege, MreqDebug, MreqType, and other signals for various embodiments. L4 Interconnect 3534 supplies the MreqInfo signals via lines 3538 to the DMA Firewall and other firewalls 3512.*i*. Interconnect 3534 is also coupled to Control Module 2765 and cryptographic accelerators block 3540 and PRCM 3570. PCRM 3570 is coupled via L4 interconnect 3534 to Power IC circuitry in chip 1200 of FIG. 2, which supplies controllable supply voltages VDD1, VDD2, etc. as described further in FIGS. 5 and 6.

In FIG. 3, Control Module 2765 between Interconnect 3534 and DMA Firewall 3512.1 receives a Security Violation signal when applicable from DMA Firewall 3512.1. A Flag pertaining to the Security Violation is read on every Monitor Mode switch or otherwise frequently read, or interrupt handler 2720 generates an interrupt each time one of the Flag bits is updated or activated by the hardware.

In FIG. 3, PRCM 3570 is provided in a voltage domain called Wakeup domain WKUP. PRCM 3570 is coupled to L4 Interconnect 3534 and coupled to Control Module 2765. PRCM 3570 is coupled to a DMA Firewall 3512.1 to receive a Security Violation signal, if a security violation occurs, and to respond with a Cold or Warm Reset output. Also PRCM 3570 is coupled to the SSM 2460.

Figure 4:
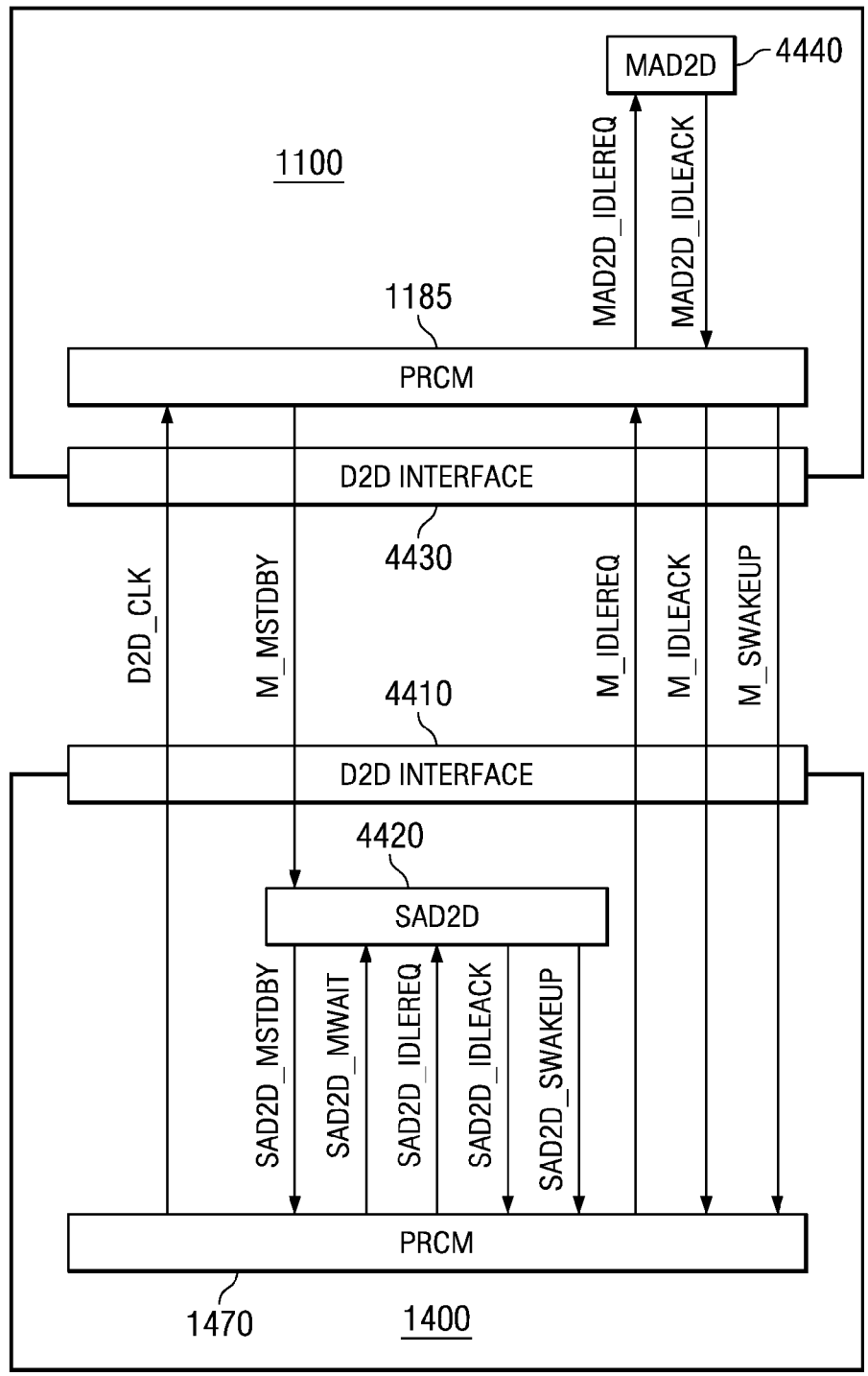
FIG. 4 is a block diagram of an inventive integrated circuit combination of stacked chips for use as applications processor integrated circuit and modem chip in FIG. 2.

In FIG. 4, a stack die solution has application processor chip 1400 coupled to modem chip 1100 through a device-to-device D2D interface 4410, 4420, 4430. PRCM 1470 (3570) and PRCM 1185 interface with the D2D to manage the modem functional clock (system clock) using a smart idle protocol. PRCM 1470 (3570) interfaces with an SAD2D module 4420 (3520.7) to manage the D2D OCP interface 4410, 4420, 4430 using the smart idle protocol and a smart standby protocol. This D2D embodiment allows independent gating of the Application processor chip 1400 OCP clock tree and the gating of the modem chip 1100 functional clock.

PRCM 1470 uses the SAD2D smart standby protocol to initiate an idle transition in the D2D clock domain. The assertion of a SAD2D standby signal SAD2D_MSTDBY initiates an idle request to a D2D clock domain of chip 1400. An idle request signal SAD2D_IDLEREQ is asserted to SAD2D interface 4420, and a modem idle request signal M_IDLEREQ is asserted to D2D slave interface 4430. The PRCM 1470 gates a device-to-device OCP interface clock to operate the D2D interface 4410 upon assertion of an SAD2D 4420 idle acknowledge signal SAD2D_IDLEACK.

As long as the modem is in a functional state wherein the modem functional clock is still requested, the modem can initiate OCP accesses on the D2D interface 4410, 4430 by de-asserting a modem standby signal M_MSTDBY. This results in the assertion of a SAD2D wakeup signal SAD2D_SWAKEUP. The clock for D2D OCP interface 4410 is restarted by the PRCM 1470 upon assertion of the SAD2D wakeup SAD2D_SWAKEUP.

Chip 1400 can put modem 1100 in a deep sleep state by asserting an idle request M_IDLEREQ. PRCM 1185 in modem chip 1100 responds to idle request M_IDLEREQ from chip 1400, and PRCM 1185 puts modem 1100 in a deep sleep state by sending an idle request signal MAD2D_IDLEREQ to modem control MAD2D 4440. The modem control MAD2D 4440 causes the modem circuitry to enter a deep sleep state. The modem control MAD2D also acknowledges the idle request signal MAD2D_IDLEREQ by asserting a signal MAD2D_IDLEACK, and PRCM 1185 in turn sends modem idle acknowledge M_IDLEACK back to PRCM 1470 in chip 1400. The PRCM 1470 gates-off the modem functional clock D2D_CLK upon assertion and receipt of the modem idle acknowledge M_IDLEACK.

Chip 1400 conversely causes modem chip 1100 to exit the deep sleep state by de-asserting idle request M_IDLEREQ. Also, modem chip 1100 can initiate exit from the deep sleep state by PRCM 1185 (still on) asserting a D2D modem wakeup signal M_SWAKEUP. Unless overridden by operations in chip 1400, such as by a signal SAD2D_MWAIT, the SAD2D OCP interface clock and modem functional clock D2D_CLK are each restarted by the PRCM 1470 upon assertion of the D2D modem wakeup signal M_SWAKEUP, and PRCM 1185 then gates D2D_CLK to the modem circuitry.

Figure 5:
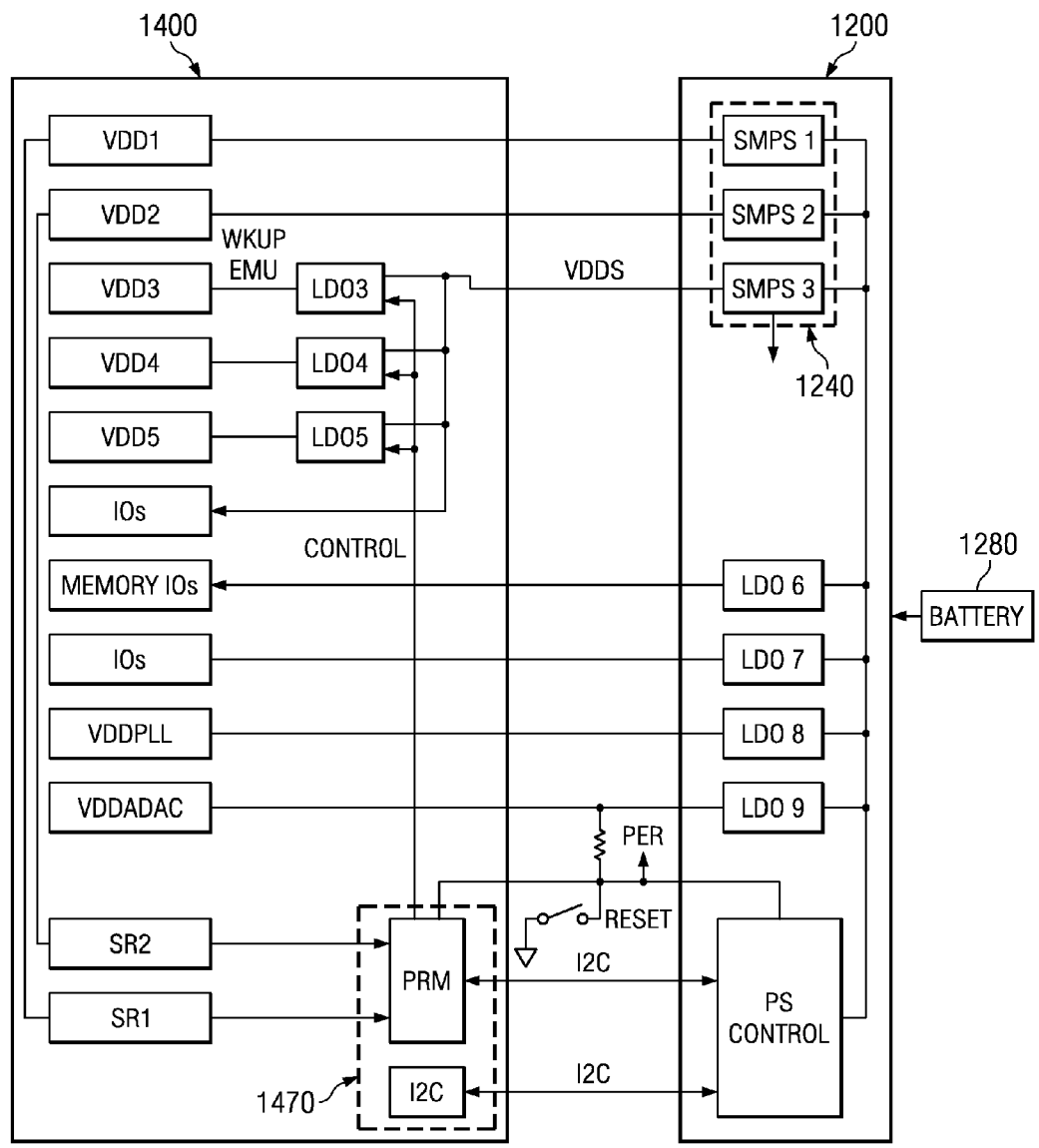
FIG. 5 is a block diagram of an inventive integrated circuit combination of an applications processor of FIGS. 2, 3, and 4 combined with a power IC (integrated circuit) of FIG. 2.

In FIG. 5, a Power and Resets Manager PRM in PRCM 1470 uses and delivers voltage values to a serial I2C interface to program the external power IC 1200 as described herein. The serial I2C interface has sufficient bandwidth to send a stream of bits representing requested voltages to facilitate changing of operating performance points (OPPs) of FIG. 7 by PRCM 1470 programming particular values of voltage. The particular values of voltage are specified by operation of a hardware voting circuitry coupled into system embodiments as shown and described in connection with FIGS. 8-15, FIGS. 18-19, and FIG. 22A/22B. Moreover, the I2C interface facilitates more accurately regulating the OPP voltages to fit best power and performance requirements when using adaptive voltage scaling AVS, discussed elsewhere herein.

Further in FIG. 5, the serial I2C interface is coupled to power supply control logic PS CONTROL in Power IC 1200, which receives the stream of bits representing requested voltages and converts them into respective voltage value requests. The power supply control logic PS CONTROL delivers the respective voltage value requests to a power supply section 1240 including switch mode power supplies SMPS1, SMPS2, SMPS3, and LDOs LDO6, 7, 8, 9 in power IC 1200.

Each voltage value request is a set of parallel bits that are coded to represent a requested amount of voltage to be actually generated as an actual power supply voltage. In response to the respective voltage value requests, the switch mode power supplies SMPS1, SMPS2, SMPS3 deliver corresponding actual power supply output voltages VDD1, VDD2, and VDDS to chip 1400. The voltages in volts of actual power supply output voltages VDD1, VDD2, and VDDS closely match the voltages represented by the respective voltage value requests. Sensors SR1 and SR2 on chip 1400 are coupled to the PRM in PRCM 1470 and used for adaptive voltage scaling AVS for voltages VDD1 and VDD2 respectively, as further discussed in connection with FIG. 6, FIGS. 10-12, and FIG. 19.

In response to PS CONTROL voltage value requests, a set of LDOs on power IC 1200 deliver further actual power supply output voltages to the chip 1400. LDO6 delivers voltage to Memory IOs. LDO7 delivers voltage to input/output buffers IOs. LDO8 delivers PLL voltage VDDPLL. LDO9 delivers voltage VDDADAC to mixed signal circuitry such as digital-to-analog converter and analog-to-digital converter circuits. A manual reset switch is connected between common and a reset line to the PRM and PS CONTROL and peripherals PER. A dropping resistor for the manual reset switch is connected from LDO9 output line to the reset line.

Figure 6:
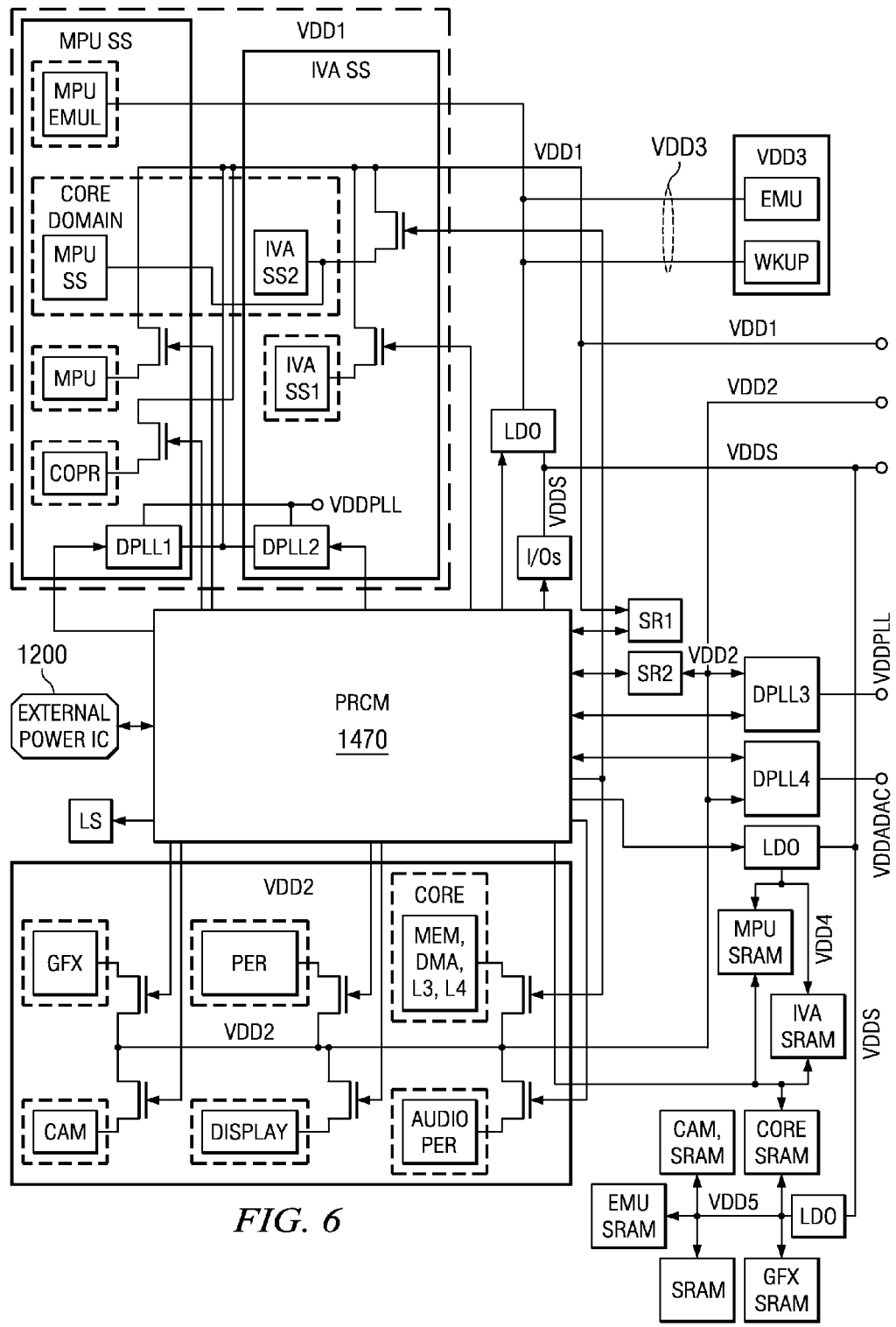
FIG. 6 is a partially schematic, partially block diagram of an inventive integrated circuit for use in FIGS. 1-5 with voltage domains and power domains.

In FIGS. 5 and 6, chip 1400 has LDOs LDO3, LDO4, LDO5 powered by voltage VDDS to respectively deliver supply voltages VDD3, VDD4, VDD5. The PRM couples on-chip control signals to these LDOs to control VDD3, VDD4, VDD5 along with other voltages control by PRM. The PRM has operations to reduce SRAM LDOs voltage VDD4 when all memories are in retention, reduce Wake-up LDO3 voltage VDD3 when the device 1400 enters OFF mode (Wake-up domain leakage reduction), increase Wake-up LDO3 voltage VDD3 when emulation is active to support high performance tracing, perform active isolation of levels shifters during VDD1 and VDD2 removal, and provide active sleep mode in analog cells when the device 1400 enters OFF mode.

Two embedded SRAM LDOs LDO4 and LDO5 respectively supply regulated active operating voltage VDD4 and VDD5 to SRAM memory banks. LDO voltage is reduced to a retention voltage level when all memory banks belonging to the LDO are in Back-Bias retention mode. The retention voltage saves leakage power and is applied to the memory arrays when they do not need to be actively operated. When not used (all memories OFF), the LDO is shut down (ON-OFF) control. These modes are automatically managed by hardware (PRM). The SRAM LDO has a Mux for reference voltages that are fed to a control circuit to deliver the memory array power supply VDD4 or VDD5.

An embedded wake-up LDO3 supplies voltage for both Wake-Up domain and Emulation domain. This LDO3 continually powers the Wake-Up domain. LDO3 includes a switch controlled by the PRM, which controls power of the Emulation domain. This switch is closed upon software request command when a debug session starts, or automatically upon JTAG plug detection. This LDO3 has three reference voltages—a normal voltage reference used in device active mode, a VDD1 overdrive voltage reference used when emulation is activated and MPU emulation trace is used, and a third voltage set when the device is in low power mode (OFF mode), in order to deliver leakage power savings. All these modes are automatically managed by hardware. The Wakeup LDO has a Mux for reference voltages. The Mux feeds a control circuit that delivers Wakeup and EMU power supply.

In FIGS. 5 and 6, Power and Resets Control Module PRCM 1470 in application processor integrated circuit 1400 (and/or PRCM 1185 in chip 1100) is coupled to power IC 1200. PRCM 1470 controls independently controllable clocks at various configurable and adjustable clock rates by control of DPLL1, DPLL2, DPLL3, DPLL4. PRCM 1470 also delivers respective control signals to turn power switch transistors off or on to power various power domains.

In FIGS. 2, 3 and 6, Power Management circuitry 1470 (1185) is provided to establish and control different power domains in a single integrated circuit (IC) and/or in a multiple IC system. The power domains handle different levels of power hierarchy and facilitate proper switching from one power domain to another without losing already-configured parameters that are desired for use after the switching or upon return to operation of a given power domain. The power domains include an MPU Power Domain, a Wakeup Power Domain, a Core Power Domain, and a Peripheral Power Domain.

A VDD1 voltage domain has plural power domains for each of MPU and IVA. A Core domain for L3 and L4 interconnects of FIG. 3, as well as various peripherals, are provided in various power domains in FIG. 6 with respective power switch transistors that couple in voltage VDD2 under control of PRCM 1470. PRCM 1470 also controls various Level Shifters LS. Voltages VDD1 and VDDPLL from power IC 1200 supply power for DPLL1 and DPLL2. Voltages VDD2 and VDDPLL are supplied for DPLL3, and voltages VDD2 and VDDADAC from power IC 1200 are supplied for DPLL4. Respective switch mode power supplies SMPS1, SMPS2, SMPS3 in FIG. 5 are connected to and supply their voltages to corresponding voltage rails for voltages VDD1, VDD2 and VDDS in FIG. 6.

A pair of sensors SR1 and SR2 are respectively supplied with voltages VDD1 and VDD2. Sensors SR1 and SR2 provide respective sensor outputs to PRCM 1470.

In FIGS. 5 and 6, voltage VDDS is coupled to LDOs which respectively provide voltages VDD3, VDD4, VDD5. A VDD3 voltage domain has power domains for Emulator and Wakeup WKUP. A VDD4 voltage domain has power domains for MPU SRAM and IVA SRAM. A VDD5 voltage domain has power domains for Core SRAM, GFX SRAM, CAM SRAM, EMU SRAM, and other SRAM. For system power-up sequencing reasons, memories IOs have a power rail independent from the other IOs. Voltage switching transistors are provided for the respective power domains in the VDD3, VDD4, and VDD5 voltage domains and are not shown in the drawings for conciseness.

In FIG. 6, the voltage domains have hardware dependencies between the various voltages. The PRCM 1470 manages these dependencies to process proper sleep and wake-up sequences. In an example, let all the VDD1, 2, 4, 5 ON/Ret/OFF depend on VDDS being on. VDD3 has states of Nominal, Low Power and Emulator (Emu). Also, for VDD1 to go ON depends on VDD2 to be ON. For VDD1 to go in Retention or OFF has a dependency on the corresponding request for VDD2 Retention or OFF. Further, let VDD1 OFF depend on VDD4 being OFF. For VDD2 to go ON or in Retention, then let the dependency be upon VDD1 ON or Retention being correspondingly requested. For VDD1 to go OFF depends on VDD1 and VDD5 to be off. Further for VDD4 to go ON depends on VDD1 to be either in ON or Retention, and same dependence applies for VDD4 to go into Retention. Likewise, for VDD5 to go ON depends on VDD2 to be either in ON or Retention, and same dependence applies for VDD5 to go into Retention. Some dependencies such as keeping VDDPLL voltage when VDD1 and VDD2 are functional are or can be placed under user responsibility.

Processor engines for battery powered devices such as PDA or smart cell phone have increased requirements in term of feature complexity and performance. To address these requirements advanced power management processes are provided, such as Dynamic Voltage and Frequency Scaling (DVFS), Dynamic Power Switching (DPS) and Adaptive Voltage Scaling (AVS) as described herein. All these processes have their respective advantages and are often more efficient for a given source of power consumption (active/standby). Combined DVFS and DPS are established in power management structure and process. A power-efficient DVFS/DPS result is achieved with minimum voltage, hence low power.

The power management processes also have specific practical constraints. For example, hardware complexity and process complexity are increased when more voltage and frequency levels are provided in DVFS, because the resulting number of OPPs (Operating Performance Point [V,F]) for DVFS increases at least as much or more than the number of permitted voltage levels and number of permitted clock frequencies. In DVFS, supply voltage V is scaled to a lowest adequate voltage sufficient to deliver various operation modes and frequencies currently predicted as needed for processing and system bandwidth at different moments in operation. Power dissipation P is proportional to frequency F times voltage-squared:

$$P = 0.5 \times C \times F \times Vdd^2 + Vdd \times I_{leakage} \qquad (1)$$

Energy dissipation is an integral or summation of power dissipation over time. In a given design the capacitance C is constant.

The different power management processes may also appear sometimes to have conflicting goals. For example, DVFS tends to reduce the idle time of the system by reducing operating voltage and clock rate to save power and thereby also reducing idle time. Reducing operating voltage itself reduces energy consumption over time in the squared first term of Equation (1) but reduces operating frequency and thus takes longer to execute a given application whereby idle time is reduced and leakage energy consumption over time is increased due to the second term of Equation (1). DPS, by contrast, tends to maximize this idle time by running an application to completion at a high clock rate and then powering down the processor core(s) to reduce leakage power dissipation $Vdd \times I_{leakage}$ in Equation (1). DVFS pairs Voltage and frequency to form OPPs (operating performance points) of different predetermined voltage and frequency where OPPn=[Vn, Fn]. By contrast, with AVS power management (e.g., using SmartReflex™ power management from Texas Instruments Incorporated) the voltage is variable instead of predetermined since the voltage is dynamically set by the hardware for each device.

Some implementations herein combine all these power management processes in spite of their apparent contradictoriness, conflict and practical constraints. In this way, even higher relative power saving and power management efficiency is synergistically conferred on all the circuits, domains, areas, and regions of power consumption in a given system.

Some implementations combine any two or more of DVFS, DPS and AVS power management processes in order to optimize the power saving in all modes of operation and for all sources of power consumption. Power and performance optimization architecture concurrently or simultaneously adapts to variations of wafer fabrication process, variations of temperature, and to changing speed requirements.

DFVS dynamically changes the OPP for various power domains in a system. When DPS is started, a given domain is switched dynamically between its Active state and a low power state (OFF, Retention, inactive). In DPS herein, supply voltage V is scaled to a) minimum DVFS voltage in operation and b) zero when deep-sleep. Adaptive voltage scaling (AVS) is used to adjust and set an actual minimum appropriate voltage in the vicinity of a voltage Vn defined by DVFS for a current OPPn.

Standby Leakage Management (SLM) improves standby time. SLM switches the device into ultra-low power modes when no applications are running. SLM saves more power while increasing the wakeup latency. SLM switches the module clocks statically between On and Off and likewise switches one or more power domains statically between On and Off. SLM lowers the voltage substantially or shuts down applicable external and/or internal voltage regulators.

Dynamic Power Switching (DPS) improves active time. Based on the hardware resources activity, as indicated by FIFO buffer status, for instance, DPS switches the device dynamically from any of several medium power modes to a lower power mode during application execution or to a low power Standby mode. DPS predicts system load and switches the module clocks dynamically between On and Off modes. DPS switches one or more power domains dynamically between On and Retention, or between On and Off. DPS provides automatic hardware detection of conditions (e.g. FIFO fill status or IO hardware signals) for sleep and wakeup transition for clock and power. DPS performs hardware management of sleep and wakeup dependency between the power domains, and hardware handshaking with modules.

In some implementations, DVFS is applied to the Processor domain while the device Core domain that represents a large part of the logic is held at a lower and fixed voltage most of the time. In this way, power is conserved because a large part of the device always works at lower than nominal voltage. Also, the DVFS hardware and software are simplified because the Core domain interconnect, memory interfaces and peripherals are working at fixed voltage and frequency.

In some other implementations allowing for lower interconnect bandwidth herein, DVFS is independently applied to the device Core domain. As used here the Core domain involves the interconnect and interfaces exclusive of the processor cores. In this case, the DVFS voltage in the Core domain is reduced to the minimum value that still allows the peripherals to be kept working at their nominal functional clock while their interface frequency is reduced. Further power savings are achieved and some DVFS software overhead is acceptable to accomplish the power savings.

Some application processor implementations embed two or more processing cores (MPU and DSP, or plural cores of either type), powered by the same voltage domain. When applying DVFS technique to such platforms, the Power Management Framework (PMF) of each core dynamically adapts, or attempts to adapt, the core voltage supply to the most adequate one. On multi-core platforms, it would be desirable for the voltage supply to be adapted to fulfill each core performance requirement, but this can lead to conflicting voltage requirements, as cores may be differently loaded. Various implementations herein solve the problem of the dynamic scaling of a shared voltage domain on multi-core platforms.

In FIG. 6, power managed DPLLs have the following main features. The DPLL has a built-in LDO coupled to a common supply so the DPLL is not impacted by voltage variations on VDD1 and VDD2. The DPLL has a built-in switch to power down completely the internal logic, and support a very low power mode where the LDO is powered down and switches are open. The DPLL supports idle modes such as Low power or fast relock bypass, Low power or fast relock stop mode. Bypass mode routes input clock directly to clocked circuitry and bypasses a DPLL. In addition, the DPLL supports a mode where it stays locked but the output clock is gated. A clock divider circuit in some cases (e.g. peripheral) is coupled to the DPLL to generate a clock-divided version of the DPLL clock output. Such a divider is fed by the same LDO as the associated DPLL so that any voltage scaling affects the divider and DPLL substantially equally.

DVFS has a frequency scaling step wherein clock frequency is changed by power management software running on one or more of the processors and re-configuring a control register to cause PRCM to reach the frequency corresponding to the selected OPP. The configuration sets new values for clock divider or sets new M, N values for each applicable DPLL of FIG. 6, with due regard to the consideration that DPLL latency (re-lock time) can be longer than divider latency. DVFS voltage scaling software or hardware configures a new N count value in the AVS sensor module SR1 and/or SR2 corresponding to the selected OPPn.

With AVS, the frequency steps are identified and AVS adapts the voltage according to the device silicon performance as described in connection FIGS. 10 and 12 elsewhere herein. In this case, for each frequency step, instead of a voltage step there is a corresponding range of voltages. This range of voltages depends on the device fabrication process and its real-time operating state (temperature) at a given frequency.

Figure 7:
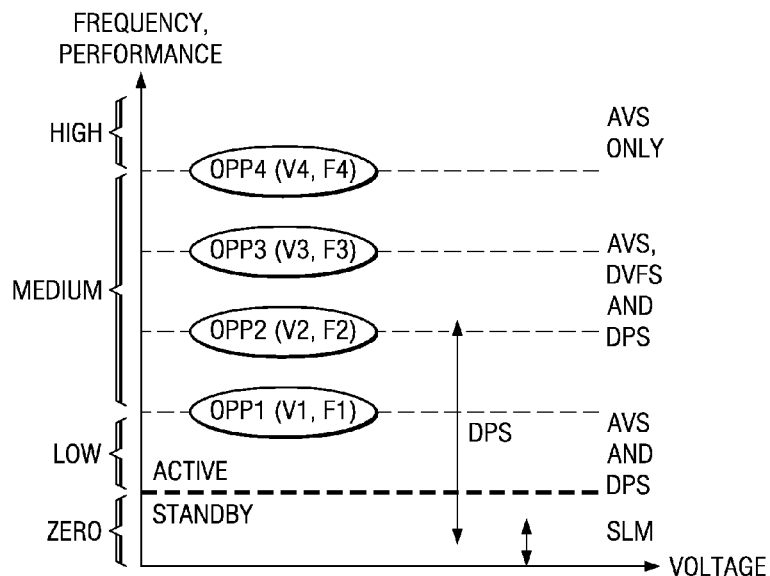
FIG. 7 is a partially graphical, partially tabular illustration of Operating Performance Points (OPPs) spread over a spectrum of increasing device performance and legended with types and combinations of inventive power management process and structure embodiments.

In FIG. 7, power saving is enhanced herein by combining DVFS, DPS, SLM and AVS techniques with hardware voting arbitration of voting requests. AVS is used at boot time to adapt the voltage to device process characteristics (strong/weak) and then continuously to compensate temperature variations. AVS also helps deliver high application performance of the device at a given OPP.

When medium application performance is desired or when application performance requirements vary, the DVFS technique is applied. The voltage and frequency are scaled to match the closest OPP that meets the performance requirement based on a voting process. When application performance requirements fall between two OPPs or when very low application performance is required and it is below the lowest performance OPP, DPS is applied to switch to low-power mode.

When combining DVFS and DPS, the operating frequency is not scaled to exactly match the minimum performance requirement $f_{target}$ as it might be without voltage scaling. Unless DPS cannot be applied for other reasons, then for a given operating point of DVFS the operating frequency is set to the OPP frequency Fn that is the maximum frequency allowed at a given voltage Vn for that OPP. This facilitates optimal process completion time and application of DPS.

If DPS cannot be applied in a given context, scaling the frequency while keeping the voltage constant does not save energy but does reduce peak power consumption. This example of an Other Power Management (OPM) technique can have a positive effect on temperature dissipation and on battery life. In situations where no applications are running and the performance requirement becomes negligible or drops to zero, SLM is suitably used.

In FIG. 7, combining of contradictory power management processes is further described. Even more enhanced active power savings are obtained by combining DVFS, DPS and AVS processes and using SLM for static leakage management. AVS is used at boot time to adapt the voltage to device process characteristics (strong/weak) and then continuously to compensate temperature variations. In some situations that require maximum available application performance, some implementations apply only AVS. In situations that require medium application performance, DVFS is applied as well as AVS.

As application performance requirement are decreased, the voltage and frequency are scaled to correspond or match to the closest OPP that meets or satisfies the performance requirement. In situations where the application performance requirement is situated between two OPPs or in situations that require very low application performance below the lowest performance OPP, then DPS is suitably applied. Notice, as shown by a long vertical arrow in FIG. 7, that DPS automatically transitions or alternates between operation at one of the OPPs and a very low power Standby mode.

In FIG. 7, when combining DVFS and DPS, and unless DPS process is inapplicable for other reasons, the frequency is adjusted or set so that the frequency corresponds to the maximum allowed at a given voltage. The frequency does not need to be scaled independently of the voltage to match exactly the performance requirement. If DPS is applied in a given context, scaling the frequency while keeping the voltage constant can reduce the peak power consumption even if energy is about the same. Reducing the peak power consumption can have a beneficial effect on the temperature dissipation and also on battery capacity.

Further in FIG. 7, in situations where no applications are running and standby performance requirement is negligible or zero, then SLM is employed.

In FIG. 7, power managed clock frequency, which affects application performance, is graphed versus power managed voltage. On standby, the voltage is kept low or zero and the frequency is zero. A horizontal line SLM in the frequency-voltage region represents that Standby Leakage Management (SLM) is employed.

For low performance applications, a low voltage V1 is established and the frequency is established at frequency F1, represented by operating performance point OPP1 in FIG. 7, by power management processes AVS and DPS.

As more applications and/or applications performance are required, beyond the maximum performance available at OPP1, then DVFS power management makes a discrete transition of operating voltage from voltage V1 to voltage V2 and increases the frequency from F1 to F2.

Further in FIG. 7, as even more applications and applications performance are required, beyond the maximum performance available at OPP2, then DVFS power management makes a discrete transition of operating voltage from voltage V2 to voltage V3 and increases the frequency from F2 to F3, and so forth. At each OPP point, AVS power management manages the voltage depending on the parameters of the integrated circuit. DPS power management is activated if the target frequency $F_{target}$ for a given process is below a threshold frequency THRESHOLD 1, 2, 3, 4 so that DPS energy savings are sufficient to justify activating DPS at the given $OPP_n$.

The process operates in reverse as fewer applications and/or less applications performance are required. When performance needed can be managed at a lower OPP, then power management process DVFS makes a discrete transition of operating voltage downward by one voltage step to reach the next lower operating point $OPP_{n-1}$.

Adaptive power supply AVS reduces active power consumption. The power supply voltage is adapted to the silicon performance either statically (depending on the device manufacturing process), or dynamically (depending on the temperature induced current performance of the device). An AVS sub-chip uses sensors to monitor the silicon performance and outputs a measure of the performance error.

When performing DVFS, the user can program a new operating point in the sensor module by programming the new frequency target and causes the sensor module to re-calculate the error. When error data is stable, it is transmitted to the Voltage Processor. The Voltage Processor takes the average frequency error from the AVS sub-chip and determines the appropriate voltage level to program into the power supply. The Voltage Processor monitors the interrupt signal and error value from the AVS sensor module SR, and automatically adjusts the power supply by sending a voltage command to the Voltage Controller. The process is described in detail in connection with FIGS. 10 and 12.

Figure 8:
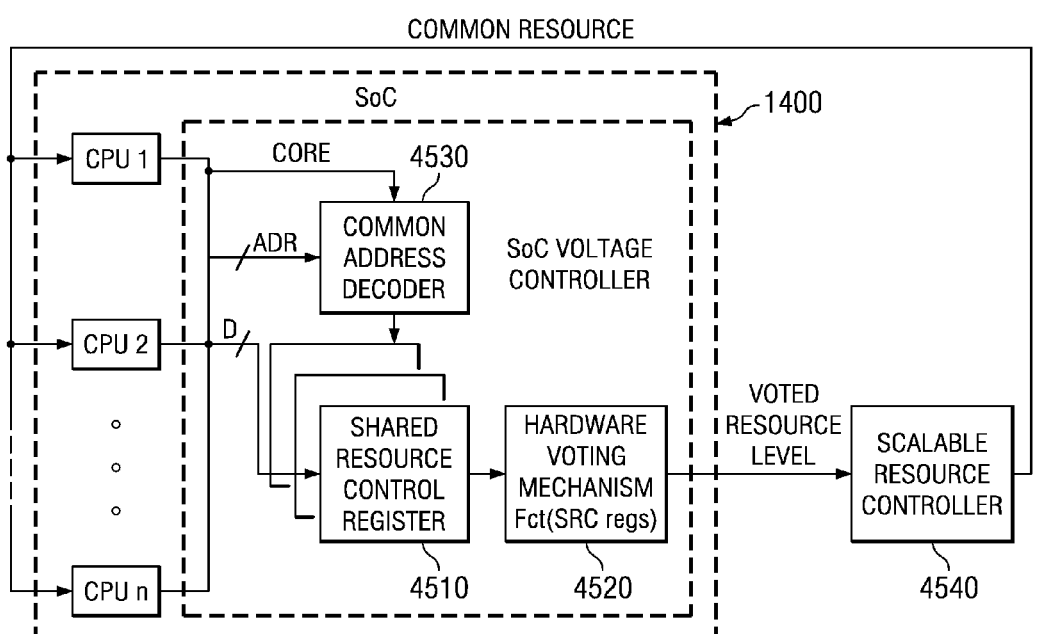
FIG. 8 is a block diagram of an inventive power management voting or arbitrating circuit for the inventive systems of FIGS. 1-7 and 20-22B.

In FIG. 8, in some embodiments each processor core CPU 1, CPU2, . . . CPUn writes the voltage it needs to run at into a dedicated register(s) 4510.i coupled to a hardware voting mechanism 4520. Using a hardware voting mechanism 4520 that is additional to any of processor cores, each core writes into respective requested bit-fields of register(s) 4510.i coupled with this hardware voting mechanism 4520 a multi-bit representation of its (the core's) own power management requirement or request. The hardware voting mechanism 4520 selects the applicable one of the power management requirements or requests thus written and couples the selection as a directive to a scalable resource controller 4540 such as a controllable power regulator or controllable power supply.

FIG. 8 illustrates an example of an electronic circuit that includes a set of processors CPU 1, CPU2, . . . CPUn that use a shared resource, such as voltage and/or clock frequency and/or other common resource(s) for operation of the set of processors. The shared resource has resource levels that may be in several discrete steps as in FIG. 7 or lie along a continuous range. A set of shared resource control registers 4510.i are coupled to the set of processors CPU 1, CPU2, . . . CPUn. At least two of the shared resource control registers 4510.i are operable to store respective multi-bit values representing respectively requested levels among the plurality of resource levels. The processors CPU 1, CPU2, . . . CPUn are each operable to supply a respective multi-bit value, such as requested level of voltage, to at least one of the corresponding shared resource control (SRC) registers 4510.i. An arbitrating circuit, such as hardware voting mechanism 4520, is coupled to the shared resource control registers 4510.i and is responsive to output a multi-bit value, designated VOTED RESOURCE LEVEL as a function Fct(SRC regs) of the values in the registers 4510.i, representing an arbitrated resource level of the shared resource. The electronic circuitry further has a scalable resource controller 4540 responsive to the arbitrating circuit, e.g. 4520, to deliver the shared resource to the set of processors CPU 1, CPU2, . . . CPUn at substantially the arbitrated resource level of the shared resource represented by the multi-bit value output from the arbitrating circuit, e.g. 4520.

For instance in the case of DVFS, cores CPU 1, CPU2, . . . CPUn write into the hardware voting mechanism 4520 the new voltage each core requests for the domain. The hardware voting mechanism 4520 allows the new voltage if it is compliant with the voltage requests of each of the processor cores according to a function thereof designated Fct(SRC regs) in FIG. 8. Hardware voting mechanism 4520 then automatically delivers a command or Voted Resource Level to scale the voltage as specified by that function (e.g., the highest requested voltage as in FIG. 9 or minimum error as in FIG. 19) or includes the circuitry 4540 itself to scale the voltage to the highest request voltage. The function Fct(SRC regs) may also represent control over plural resource dimensions, such as voltage and frequency as in FIG. 15. Hardware support for shared voltage domains is thus provided in a variety of embodiments or in a variety of power management modes in a given embodiment.

Suppose one core (one PMF) were established as a resource owner core for the shared voltage domain. The resource owner core controls the power management of a shared voltage domain resource. This resource owner PMF scales up and down the voltage based on the requirements or requests received from all the cores of the platform. The resource owner PMF is responsible to set the correct common voltage supply of the different cores CPU 1, CPU2, . . . CPU n, based on dynamic requests provided by the PMFs of each of the cores in the multi-core system. The resource owner core/PMF is interrupted and, in some cases, awakened by a wake up signal responsive to the interrupt with consequent power consumption, by any new request from another core/PMF. In other words, if the resource owner core is in a power saving mode such as a sleep mode, it receives a wake up signal every time another core issues a new request, in order to potentially do the voltage scaling, which may not need to be changed. By contrast, the embodiment of FIG. 8 desirably hides the sharing of the voltage domain from the cores. Each can require or request different voltages, without waking up any other core.

In an embodiment of FIG. 8, the sharing of the voltage domain is hidden from the cores CPU 1, CPU2, . . . CPU n and is abstracted. Each core can request a different voltage by identifying itself (CORE line) and providing address ADR to a common address decoder 4530 without waking up another core. Common address decoder 4530 is coupled to the set of applicable processors which vote or bid on the shared resource. The processors indexed i are each operable to supply a respective address to the address decoder 4530. Address decoder 4530 selects at least one of the corresponding shared resource control registers 4510.*i* in response to the respective address. In this way, the respective multi-bit value from a given processor is stored to at least one of the corresponding shared resource control registers 4510.*i*.

Some embodiments store to exactly one of the corresponding shared resource control registers 4510.*i*. The requesting core then feeds a requested voltage value, called a vote voltage value, on a data line D to the shared resource control register 4510.*i* for that particular CPU i. Each PMF or core acts as if it has its own voltage domain. There is no interaction or data exchange between cores and PMFs for power management purposes in some embodiments.

The hardware of FIG. 8 reduces software overhead and simplifies and facilitates implementation of software. The use of a core as resource owner of the shared voltage domain resource is obviated, wherein such resource owner core would be responsible for scaling up/down the voltage based on the requirements or requests received from all the cores of the platform. If this resource owner core is in a power saving mode, it would be awakened every time another core issues a new request in order to potentially do the voltage scaling.

Moreover, data exchange, synchronization, and interaction between cores is obviated, thereby saving hardware real estate because there is no inter-processor communication (IPC) to implement for power management purposes in some embodiments. The PMF of a given core directly writes into hardware registers of that processing core the supply voltage required or requested by that core.

Figure 9:
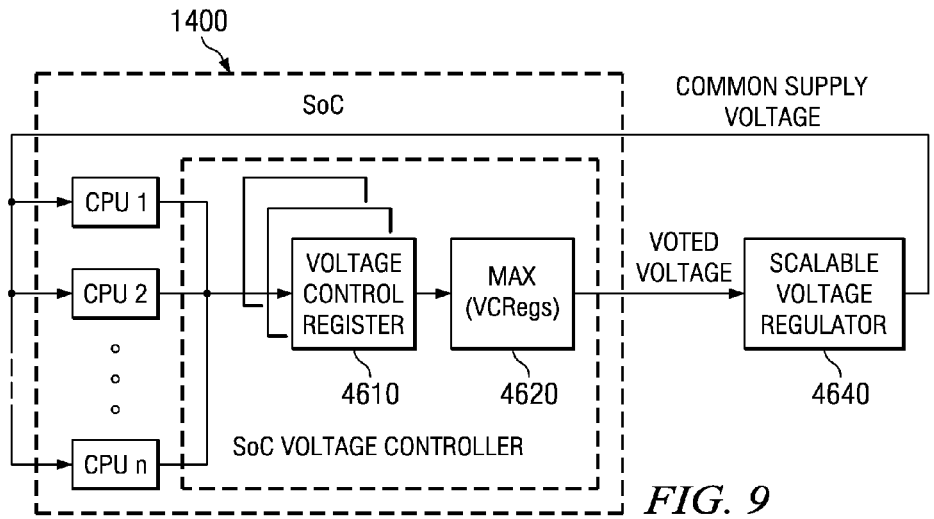
FIG. 9 is a block diagram of a type of inventive power management voting or arbitrating circuit for the inventive systems of FIGS. 1-7 and 20-22B.

In some embodiments of FIGS. 8 and 9, cores in power down mode are not potentially awakened by other cores. System operation is simplified and provides enhanced power savings. Reducing software overhead also decreases global power consumption.

The hardware of FIGS. 8 and 9 is at least as flexible, or more flexible, in operation as software resource owner PMF technology. In FIGS. 8 and 9, a hardware voting mechanism operates to arbitrate scaling of a shared voltage domain. The hardware obviates waking up a core where some policy manager is running every time a constraint is updated by another core. It is not necessary for any one core have responsibility to control (or own) the shared voltage domain resource nor responsibility for scaling up/down the voltage based on the requirements or requests received from other cores of the platform. If a core had such responsibility, then if such core were in a power saving mode, it would be awakened every time another core issued a new voltage scaling request. The hardware voting mechanism herein is independent of all the cores and hides the sharing of the voltage domain from all the cores. Thus each core can require or request different voltages and issue requests for different voltages, without waking up any of the processor cores of the platform.

In FIG. 9, each core writes into a dedicated register 4610.*i* the voltage magnitude, or coded multi-bit representation thereof, at which that core needs or requests to run. The hardware voting mechanism 4620 then automatically scales the voltage to the highest requested voltage. Depending on the type of power management, the requested voltage in pure DVFS may be substantially the minimum required or requested for the processor to perform the tasks currently-demanded of it. Or the request may be a higher value, such as the core may request for DPS or combined DVFS/DPS power management, so as to run an application swiftly to completion and then put the processor to sleep to minimize the static leakage.

In FIG. 9, multiple voltage/frequency domains are power managed by the power management circuit. Processor cores in a first power domain make respective voltage requests to the voting circuit. The controllable voltage for each power domain is established according to the highest voltage request determined from among processor cores making requests from the given power domain, and ignoring those processor cores that are in a not-awake state.

The circuitry of FIGS. 8, 9, 13, 15, 18 and 19 helps avoid latency problems in scale up/down, and avoids missing processing deadlines. Otherwise, sometimes a platform might be frozen during scaling latency and another core be frozen due to messaging.

In FIG. 9, a Voltage Control Registers block 4610 provides one register per core. In some embodiments, each register has the same physical address but is selected by a CPUi core identification for increased flexibility. A data input format is provided for a Scalable Voltage Regulator 4640. The Data format of each register in the Voltage Control Registers block 4610 in some embodiments is identical to the data input format provided for the Scalable Voltage Regulator 4640. Such data format in various embodiments is alternatively established in terms of raw millivolts, number of steps of n millivolts, a coded representation of the voltage or other shared resource, or other suitable data format.

The hardware voting mechanism reduces scaling latencies and power consumption by avoiding messaging between CPUs for voltage negotiation. Moreover, scaling latencies and power consumption are reduced by avoiding waking up a sleeping CPU for voltage negotiation. In the hardware voting mechanism 4620 the circuitry provides an output called Voted Voltage that suitably has the same data format as the data format used in the Voltage Control Registers block 4610. The Voted Voltage is set equal to the maximum of the values in the registers in the Voltage Control Registers block 4610 according to Equation (2).

$$VV = MAX[RegVC(i)] \qquad (2)$$

Figure 10:
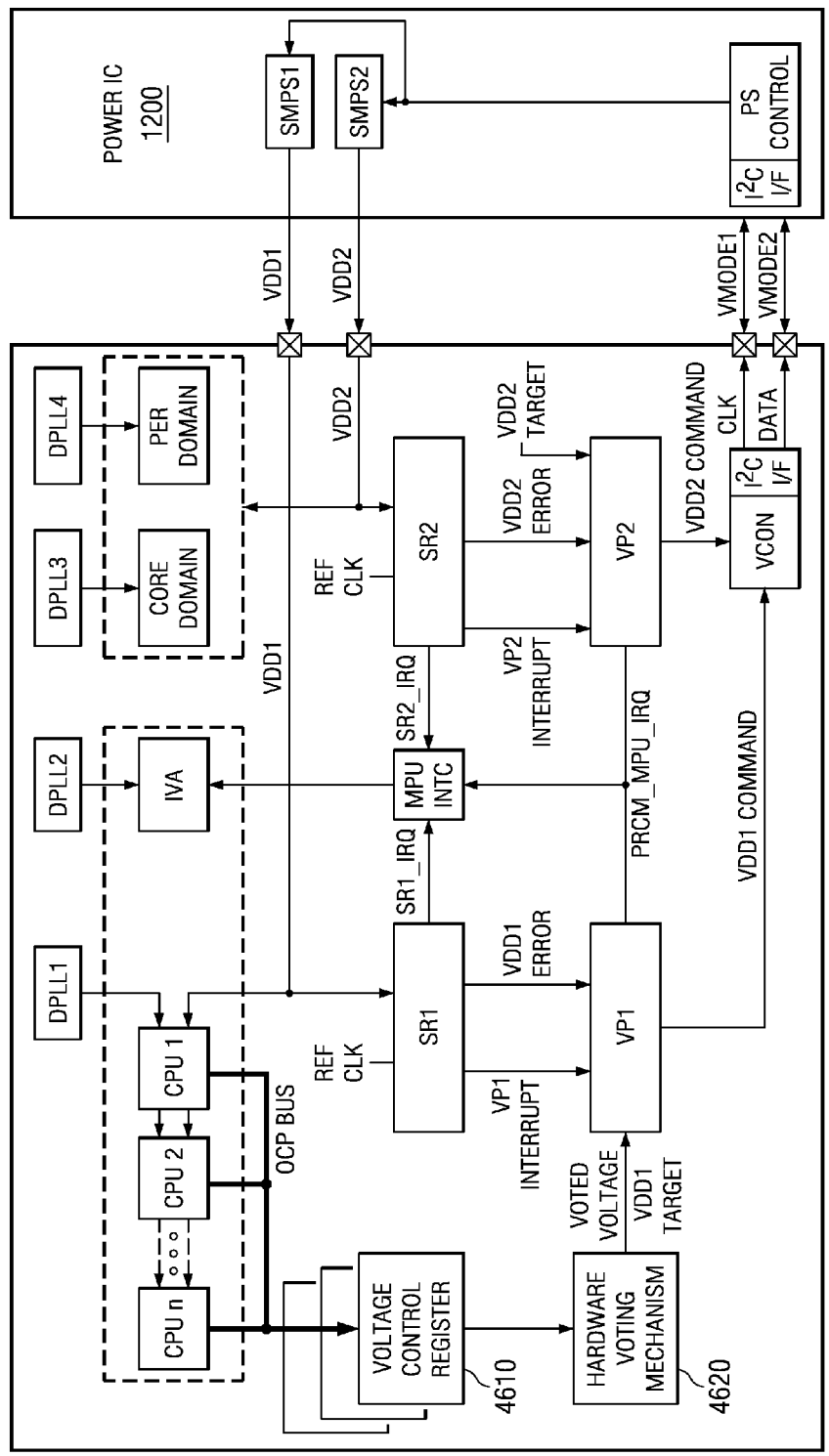
FIG. 10 is a block diagram of another type of inventive power management voting or arbitrating circuit combined with a power integrated circuit and CPU cores for the inventive systems of FIGS. 1-7.
Figure 11:
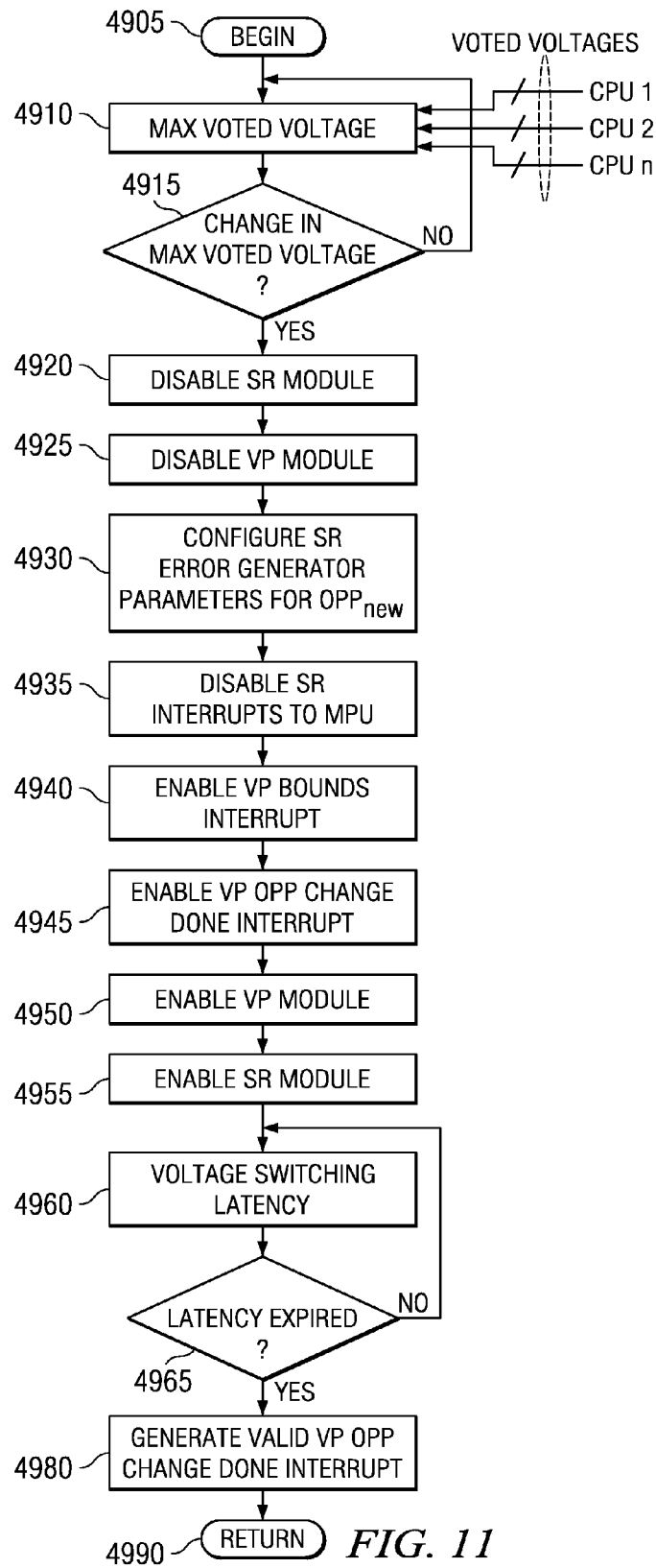
FIG. 11 is a flow diagram of an inventive process of power management such as for use in the structures of FIGS. 1-13 and 20-22B.
Figure 12:
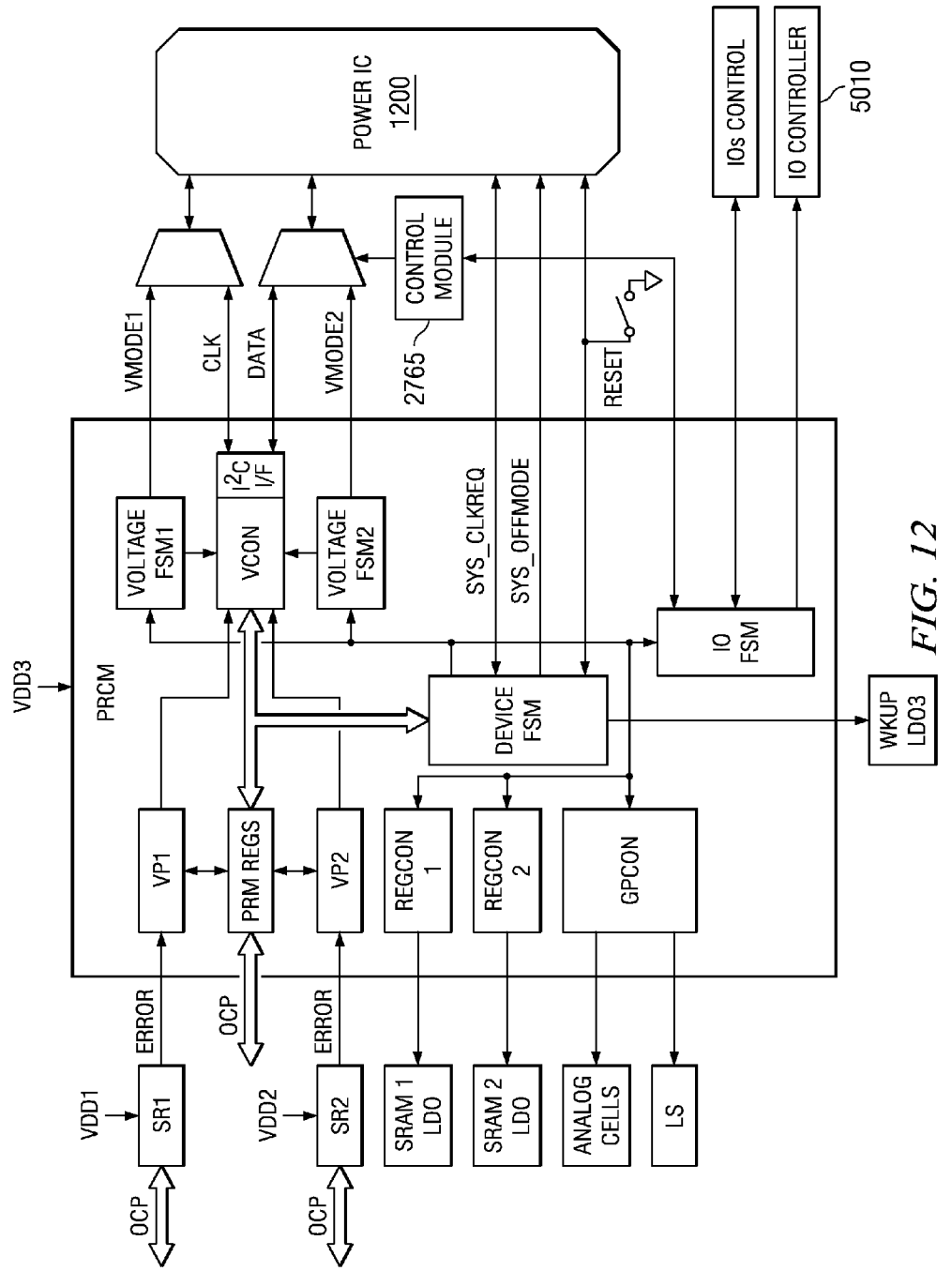
FIG. 12 is a block diagram of another type of inventive power management circuit combined with a power integrated circuit and CPU cores for the inventive systems of FIGS. 1-7 and 20-22B.

Description turns now to FIGS. 10-12. In AVS herein, one or more sensor modules having ring oscillators or delay lines are established on the physical silicon of processor(s) on an integrated circuit chip. The ring oscillators by their frequency output gauge the performance of the silicon within the current environment established by the integrated circuit fabrication process in which the chip was made, the currently-applied operating voltage, and the currently-existing operating temperature at a present moment of run-time. See for some background, e.g., US Patent Application Publication US2005/0194592 dated Sep. 8, 2005, which is hereby incorporated herein by reference. A delay line approach to AVS measures the time delay that a delay line on the particular semiconductor material at a given temperature produces.

These environmental factors are expressed as a vector (Process, Voltage, Temperature) on which the maximum operating frequency of the chip depends. The circuit continuously compares the expected oscillator frequency or expected delay line delay for each pre-defined OPP of FIG. 7 to the on-chip measured frequency of the oscillator. A digital circuit is provided to provide clock generation and control and generates stable clock references to the sensor core, provides a Min/Max/Average, and generates statistics about silicon performance over time. An error generator calculates the percentage frequency error when compared to targeted silicon performance.

For each voltage domain, pre-defined OPPs of FIG. 7 are established. To each OPP corresponds an N-count value that is set, configured into, or built into sensor SR and which represents a simulated or reference oscillator frequency. This N-count value is derived through a combination of static timing analysis and spice analysis and is related to the frequency of the ring oscillator for the particular OPP. The SR circuit continuously compares the N-count value to the on-chip sensor module SR measured frequency of the oscillator. The sensor SR circuit processes the difference and derives an error output that indicates whether to raise or lower the voltage. The error is output on SR interface and is related to the actual voltage step that needs to be applied.

In FIGS. 10-12, each voltage processor VP monitors the error output on its associated SR1 or SR2 interface and converts the error output into a voltage level to be sent over to the external switch mode power supply SMPS by the voltage controller VCON. Voltage controller (VCON) handles the I2C serial interface with external switch mode power supply SMPS. The VCON receives a voltage level from the voltage processor and also a command from the voltage state machine FSM of FIG. 12. In active mode, the VCON formats the voltage level and command and sends them over the I2C interface to control the external SMPS. When the device is in standby mode, the voltage controller VCON is then driven by the voltage state machines FSMs to allow the external supply to enter low power mode. The sensors SR, the voltage processor VP, the voltage controller VCON and the external SMPS are coupled to form a closed loop feedback system that automatically adapts the voltage of each voltage domain. This system supplies the voltage domain with the minimum voltage that matches the domain frequency, process and temperature operating conditions.

In FIGS. 3 and 10, the voting processors have a respective interrupt input, and in some embodiments the voting inputs of hardware voting mechanism 4620 are independent from each such interrupt input. The processors are operable for inter-processor communication, such as by an OCP bus. The voting circuit controls its voltage control output, designated Voted Voltage VDD1 Target in FIG. 10, separate from inter-processor communication. In some embodiments, at least two of the voting processors have a different architecture from each other, such as RISC and DSP, or CISC and DSP, or RISC and CISC, different levels of superscalar pipeline numbers or depth, in-order and out-of-order, or other different architectures. The I2C circuit acts as a serial communication circuit that couples the resource request arbitrating circuit output provided by hardware voting mechanism 4620 to a scalable resource controller in Power IC 1200.

In FIGS. 10 and 12, the digital circuit of sensor SR, as noted earlier hereinabove, processes the difference between the N-count value and SR measured frequency and derives an error amount that indicates whether to raise or lower the voltage. The error is related to the actual voltage step that needs to be applied. In some embodiments, the error is output on the digital circuit interface to a voltage processor VP1 or VP2 as in FIGS. 10 and 12. The voltage processor VP1 or VP2 monitors the error output on the circuit interface and converts it into a voltage level to be sent over to the external SMPS by the voltage controller VCON. The voltage controller VCON handles the dedicated I2C serial interface with external SMPS. The voltage controller VCON receives voltage level from the voltage processor and also command from the voltage FSM, and formats them and sends them over the I2C interface to the external SMPS. A serial interface protocol such as I2C or SPI or other communication protocol provides flexibility wherein data conveyed becomes independent of the medium and the medium becomes independent of the data.

In some other embodiments, the errors generate an interrupt to the MPU that processes the interrupt and adapts the external switch mode power supply (SMPS) voltage accordingly.

In FIGS. 10 and 12, Sensor modules SR1 and SR2 are respectively provided for voltage domains for VDD1 and one for VDD2. These sensor modules are configured through their own OCP bus interface. Continuous hardware calibration of the sensor modules is provided. The user can also disable the voltage processors and do continuous software calibration, based on interrupts generated each time the error values are updated.

Voltage processors VP1 and VP2 are respectively associated to these sensor modules to convert generated frequency errors into voltage commands. Each of the Voltage Processors contain Look-Up Tables and is correctly initialized and configured to optimize the voltage control. Voltage Processors VP1 and VP2 and related control registers are parts of the PRM module.

AVS in some process and structural embodiments operates to variably lower the operating voltage of the transistors (e.g., from 0-200 mV) over the range of weakest process transistors to strongest process transistors. Thus, the AVS voltage is reduced for nominal silicon so that the voltage and speed of the nominal silicon is closer to that of weak silicon. The AVS voltage for strong silicon is even further reduced than for nominal silicon so that the voltage and speed of the strong silicon is closer to that of weak silicon as well. This variable control of the operating voltage depending on the weak, nominal, and strong processes, compresses the path delay distribution over numbers of the thus-controlled devices considered collectively. Moreover, AVS operated in this way results in significant active power reduction and leakage power reduction.

The AVS process herein acts as a voltage control loop that presents a degree of latency representing the time needed to respond to changes in its environment. This latency is responsive such as to process variation, power supply DC level, and temperature changes, and DC portions of the printed circuit board (PCB) and device IR (ohmic) voltage drop. In FIGS. 10 and 12, each voltage sensor and digital filter accumulates a measured value of a parameter and its average error AvgError according to an averaging window. The voltage processor then sends an interrupt to the power supply interface control logic.

In some embodiments, the interrupt is serviced, the voltage is calculated, and the I2C port is requested, any I2C contention resolved, and I2C serial exchange is performed. Next the power supply responds to the calculated voltage over a period of time called the settling time. The settling time depends on the size of the voltage step and the voltage slew rate of the power supply. The voltage processor suitably waits a somewhat longer period of time than the settling time to ensure voltage control loop stability and have desirable overdamping (substantially non-oscillatory settling behavior) in the control loop performance. The voltage is changed from one OPP to another OPP of FIG. 7 in a suitable number of steps so that overdamped performance is maintained. In some embodiments the settling time for widely-separated OPPs is on the order of a millisecond, more or less.

In FIGS. 10 and 12, the PRCM has a Power and Reset Manager PRM that is located in the WAKEUP domain and runs off the sleep clock (32 kHz or sys_clk on order of tens of MHz). The PRM controls a system clock sys_clk oscillator and supplies the 32 kHz and sys_clk to a Clock Manager CM controllably coupling these clocks to one or more DPLLS. PRM generates primary source clock, device global reset, and local reset for power domains. PRM controls power domains sleep/wakeup transitions between inactive and retention and off power states. PRM controls isolation cells, controls retention flipflop save and restore, controls power domain switches, controls memory states, and controls level-shifters. The PRM detects power domain wakeup events, manages power domain wakeup transition dependencies, and controls wakeup domain input isolations. The PRM sequences device transition to and from OFF mode, controls analog cells OFF state (internal LDO, etc.), and switches to OFF mode pad configuration. The PRM controls IO isolation for power transition glitch control, and IO wakeup, and detects OFF mode wakeup events. The PRM manages the interface with the AVS sensors, and manages the interface with power IC 1200 such as to supply voltages VDD1 and VDD2 from external switch mode power supply SMPS1 and SMPS2. The PRM latches the sys boot signals at power on reset from POR 1042 of FIG. 1.

In FIG. 12, the PRM includes a device finite state machine DEVICE FSM, one or more voltage domain finite state machines VOLTAGE FSM, and an input/output finite state machine IO FSM. In addition the PRCM includes each voltage processor VPi to interface with the Sensor Modules SR1 and SR2 and compute a voltage value from the sensor module SR error, and the voltage controller VCON to interface with voltage processor VP and format and send the voltage value over the I2C interface.

In FIGS. 12 and 10, the PRCM has an OCP (Open Control Protocol) bus interface to access PRM control registers and status registers. This OCP interface runs off the system clock and is connected to the wakeup block. The PRM registers include Voltage Control Registers 4610 and other Control Registers and are used, for instance, for DVFS/DPS power managed operation. Some embodiments situate these PRM registers and Control Registers in the Control Module 2765 of FIG. 3. Other embodiments have the PRM registers and Control Registers situated in the PRCM 3570 of FIG. 3 and made separate and configurable and run-time re-configurable from Control Module 2765 and/or the OCP bus from MPU and/or IVA processors. Some hardware-controlled embodiments load the contents of the PRM registers and Control Registers from and under the control of the Device FSM of FIG. 12 and control those registers to power manage the system in a manner such as depicted in FIGS. 16 and 17A-17D. Higher level parameters or controls on functionality of Device FSM are configurable by boot or initialization software from MPU and/or IVA processors.

The Clock Manager CM is located in the Core domain and includes a Clock Generator and a Clock Controller. The Clock Manager CM has an OCP interface for a CPU core to access CM control and status register bit fields in Control Registers. Clock Generator CG generates and distributes various clock signals and clock enable signals used in the SOC device. Part of the Clock Generator CG is located in the MCU and IVA domain to generate the clock of these sub-systems. The CG uses as input the source clock from the PRM and the DPLLs. Clock Controller CC handles device clock gating and manages power domain sleep/wakeup transition between On and Inactive power states. Clock Controller CC manages Smart Idle handshake protocol with target modules, and manages Smart Standby handshake protocol with initiator modules. Clock Controller CC detects power domain sleep transition conditions, manages power domain sleep transition dependencies, and controls power domain clock signal gating. Clock Controller CC has a Module clock state machine FSM and a Clock manager domain state machine FSM associated with Control circuitry.

In FIG. 10, PRM has an interrupt circuit to generate interrupts via an interrupt controller MPU INTC to MPU and IVA processors. The interrupts respond to and depend on PRCM and CM internal events or external peripherals wake-up events. Depending on the context, the PRM can process a domain wake-up associated to the interrupt event. The interrupt events are maskable in the PRM interrupt enable register. Their status is readable in a PRM interrupt status register.

An interrupt PRCM_MPU_IRQ in FIG. 10 is coupled from PRM to the MPU Interrupt controller INTC when any of the following events has occurred. 1) MPU peripherals group wake-up event, 2) End of ON time event, 3) End of OFF time event, 4) a sleep or wake-up transition has completed (in imaging/video, compressor, SGX, DSS, camera, peripheral, USB host, emulator domains). Further events to which interrupt PRCM_MPU_IRQ responds are: 5) recalibration events for DPLL of MPU, IVA, Core Domain, Peripherals P1 and $2^{nd}$ Peripherals P2, and 6) status events for Voltage Controller (VCON) error, and for either of Voltage processors 1 and 2, IO pads wake-up, and either of VDD1 and VDD2 voltage control timeout.

Another interrupt PRCM_IVA2_JIRQ is coupled from PRM to IVA Wakeup generator when an IVA peripherals group wake-up event has occurred or a forced wakeup transition has completed for IVA domain wakeup.

In FIG. 11, a process for OPP change commences with a BEGIN 4905. A power management process supplies a controllable voltage for first and second processors and the process includes operating each processor to make respective voltage requests and arbitrating the voltage requests to automatically control the controllable voltage to establish the highest magnitude of the respective voltage requests. For instance, a step 4910 receives voltages voted by CPUs 1 through n and determines the maximum voted voltage. A decision step 4915 determines whether any change in the maximum voted voltage has occurred, and if not then operations go back to step 4910, either directly or via other processes outside FIG. 11 and until a change in one of the voted voltages from CPUs 1 through n occurs. When a change (YES) at step 4915 occurs, then operations proceed to a step 4920.

In FIG. 11, step 4920 disables each sensor module SR. A step 4925 disables the corresponding Voltage Processor VP module. A step 4930 configures the sensor module SR error generator parameters for the new $OPP_{new}$. A succeeding step 4935 disables the sensor module SR interrupts to the MPU. A step 4940 then enables the voltage processor VP Bounds interrupt when the error exceeds bounds for staying in a given OPP. If exceeding bounds, DVFS signals hardware to change the OPP.

Further in FIG. 11 a step 4945 then enables a VP OPP Change Done interrupt from hardware indicating completion of the OPP transition. Next a step 4950 enables the Voltage Processor VP module, and a step 4955 enables each Sensor Module SR or the applicable Sensor Module SR. A further step 4960 represents voltage switching latency in the I2C communications path and the power IC 1200. A decision step 4965 determines whether the latency has expired by activating a counter and counting to expiration of a predetermined or configured time interval. When the latency has expired, operations proceed to a step 4980 to generate an interrupt called a Valid VPP OPP Change Done interrupt. Then operations are completed and reach RETURN 4990.

In FIG. 12, the PRCM Voltage management has several blocks that manage the different voltage sources. Two voltage processors convert AVS sensor errors in voltage values sent to the voltage controller VCON. The voltage FSMs 1 and 2 manage respectively VDD1 and VDD2 voltage. They either send commands to the voltage controller (I2C mode) or controls VMODE1 and VMODE2 signals (direct control mode). The voltage controller VCON gathers commands from register (direct access), voltage processors and voltage FSMs. VCON then handles communication with the external IC through the dedicated I2C interface. A GPCON FSM controls SRAM and wake-up LDOs, analog cells sleep mode and level shifters. A device FSM sequences GPCON, voltage FSMs and IO FSM during device OFF sleep and wake-up transitions. An I/O finite state machine IO FSM manages IO OFF mode control and an I/O controller 5010. In this way, static leakage management (SLM) is integrated with DVFS/DPS/AVS active power management.

Adaptive voltage scaling AVS reduces active power consumption. The power supply voltage is adapted to the silicon performance either statically (depending on the device manufacturing process), or dynamically (depending on the temperature induced current performance of the device). An AVS sub-chip uses SR sensors to monitor the silicon performance and outputs a measure of the performance error.

When performing DVFS, the software or user can program a new operating point in the sensor module by programming the new reference frequency REFCLK and causes the sensor module to re-calculate the error. When error data is stable, it is transmitted to the Voltage Processor. The Voltage Processor takes the average frequency error from the AVS sub-chip and determines the appropriate voltage level to program into the power supply. The Voltage Processor monitors the interrupt signal and error value from the respective AVS sensor module SR, and automatically adjusts the power supply by sending a voltage command to the Voltage Controller.

In FIGS. 10 and 12, Sensor modules SR1 and SR2 are respectively provided for voltage domains for VDD1 and one for VDD2. These sensor modules are configured through their own OCP bus interface. Continuous hardware calibration of the sensor modules is provided. However, the software or user can also disable the voltage processors and do continuous software calibration, based on interrupts generated each time the error values are updated.

Two instances of Voltage Processors VP1 and VP2 are respectively associated to these sensor modules SR1 and SR2 to convert generated frequency errors in voltage commands. Each of the Voltage Processors VP1, VP2 respectively contains a Look-Up Table and is correctly initialized and configured to optimize the voltage control. Voltage Processors VP1, VP2 and related Control Registers are parts of PRCM module.

Sensor Module SR1 couples VDD1 error to an Error-to-Voltage converter block in voltage processor VP1. The Error-to-Voltage converter monitors the Sensor Module SR1 error interface and converts the frequency error to a voltage level. Then the Error to Voltage converter in turn provides a voltage command to an SMPS voltage register in Voltage Processor VP1. Sensor Module SR1 provides an interrupt signal to a Voltage Processor Finite State Machine VP FSM, which in turn controls the Error-to-Voltage Converter and the SMPS voltage register. The VP FSM provides an interrupt clear back to Sensor Module SR1. VP FSM provides an interrupt PRCM_MPU_IRQ to the MPU interrupt controller INTC. The SMPS register supplies an SMPS voltage command to the Voltage Controller VCON which in turn communicates via I2C to Power IC 1200 to adjust the voltage to the commanded voltage. Voltage Controller VCON returns an SMPS acknowledge SMPS ACK.

VP FSM of FIG. 12 has a section associated with interface I2C IF in FIG. 10. A register interface contains configuration and control signals for the Voltage Processor VP1 and provides a mechanism for the host MPU to read the Voltage Processor VP1 status. When a voltage change is requested by low-active SR_interruptz, the VP FSM processes the information given by the register interface and generates a voltage update using a comparator process. When comparison supplies equality signal Equal_val, the update is ready. VP FSM sends an update called a SMPS Voltage Command (FIG. 21) to the SMPS interface, and waits for the SMPS interface to acknowledge that the voltage has been set. After the acknowledgement ACK is received, the VP FSM waits at a state designated WAIT for the SMPS voltage to settle before clearing or resetting (IRQCLKR) the Sensor Module interrupt and returning to an IDLE state to wait for a new voltage change request.

The VP FSM of FIGS. 10-12 administers and waits for voltage updates for a period of time based on the size of the voltage requested, allowing the supply voltage to settle. These wait times are programmed into a configuration register and are based on the operational characteristics of the SMPS and I2C communications subsystem. When a specified delay time has elapsed for the SMPS voltage to settle, the Voltage Processor Controller clears the Sensor Module SR1 interrupt.

The Voltage Controller is a part of PRM and interfaces internally to the Voltage Processors, as well as with the two voltage device FSMs. Externally, it interfaces to a Power IC, through a dedicated I2C interface. To reduce latency of voltage changes, the Voltage Controller is configurable to run in High-speed I$^2$C mode.

The Voltage Controller VCON handles five input ports as follows: VDD1 and VDD2 Voltage Processor ports input voltage commands depending on sensor module calculations (during device activity). VDD1 and VDD2 device FSMs input voltage commands when the device enters in retention mode, or in OFF mode, and upon device wake-up. Direct software control is a fifth input port.

Overlapping requests are managed on the five ports. Each of the internal ports has a handshake to indicate when the I$^2$C frame resulting from the request on that port has been acknowledged by the external Power IC. The Voltage Controller uses some PRM registers for configuration values.

If Power IC 1200 does not support I2C interface, a simpler voltage command can be used to control two voltage values per voltage domain (VDD1, VDD2), controlling external VMODE1 and VMODE2 signals. These two signals are used alternatively with I2C and are muxed on the same device pins in FIG. 12. The Muxes are managed from the Control Module 2765 of FIG. 3.

Figure 13:
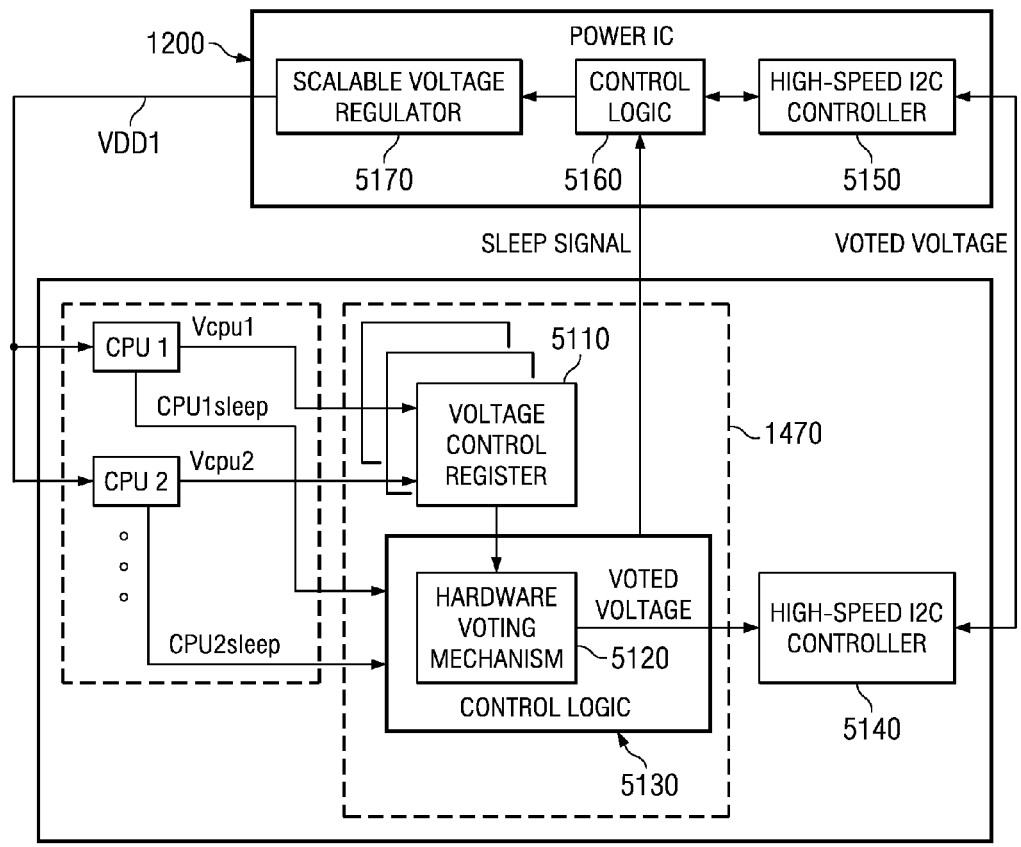
FIG. 13 is a block diagram of another type of inventive power management voting circuit combined with a power integrated circuit and CPU cores for the inventive systems of FIGS. 1-7 and 20-22B.

Turning to FIG. 13, FIG. 13 further shows sleep lines and sleep controls. A sleep signal SLEEP SIGNAL is automatically generated and controlled by the control logic 5130 in Power Management Control Module 1470. When the Sleep Signal is active (all CPUs asleep), the Power IC sets the voltage to Sleep voltage. When the Sleep signal is inactive (at least one of the CPUs awake), the Power IC sets the voltage to the Voted Voltage.

In some embodiments, the CPU cores are provided in and as a shared voltage domain. In FIG. 13, the Voltage Control Registers block 5110 and the Hardware Voting Mechanism 5120 and its Control Logic 5130 are provided in a Power Management Control Module 1470 (1185) of FIG. 2. In FIG.

13, a serial communication interface, such as a high speed I2C controller 5140, is provided with the Power Management Control Module 1470 and the shared voltage domain CPU cores on an application processor chip 1400 of FIG. 10.

A separate Power IC chip 1200 has another high speed I2C controller 5150 coupled to Control Logic 5160 which in turn is coupled to a Scalable Voltage Regulator 5170. That high speed I2C controller 5150 receives the Voted Voltage signal from the high speed I2C controller 5140 in the application processor chip 1400. Blocks 5150, 5160, 5170 of the Power IC chip 1200 are suitably provided as a standalone chip or provided in ABB/PM chip 1200 of FIG. 2.

In FIG. 13, each CPU core CPU1, CPU2, etc. provides a respective voltage Vcpu1, Vcpu2, etc. to a respective register or register field in the Voltage Control Registers block 5110. Also each CPU core CPU1, CPU2, etc. provides a respective signal CPU1sleep, CPU2sleep, etc. to the Control Logic associated with the Hardware Voting Mechanism 5120.

Figure 14:
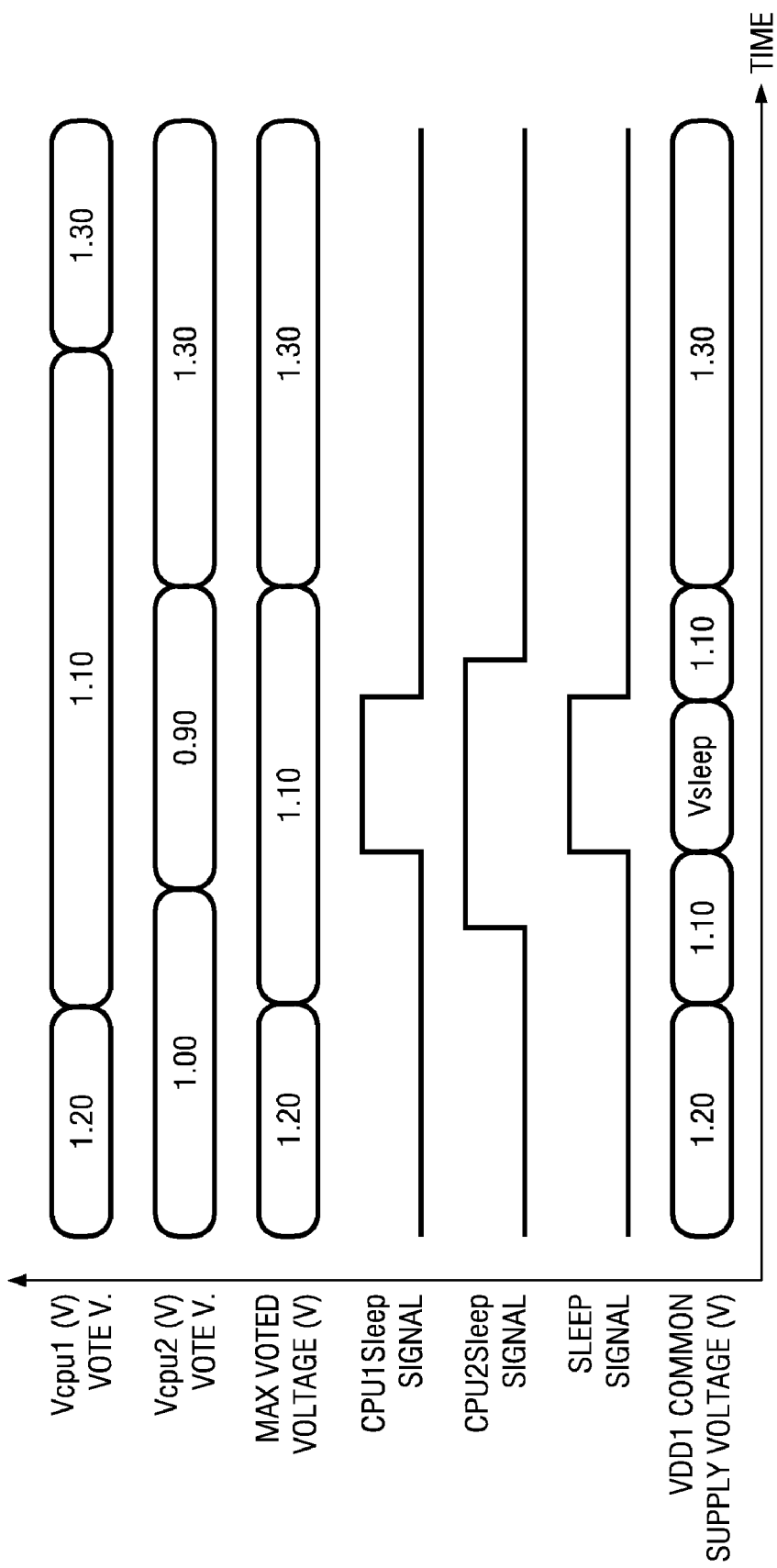
FIG. 14 is a timing diagram of voltage versus time showing an example of various inventive process signals and controls in FIG. 13.

FIG. 14 shows a timing diagram of voltage versus time depicting how the voting circuit works for a voltage domain if one of several cores is asleep or awake and how voltage is distributed to that core. In the timing diagram, cores get a voltage Vsleep from power IC 1200 for use when entering sleep mode. The value of the voltage Vsleep is suitably configured at boot time.

In FIG. 14, the timing diagram includes separate lines for behavior of respective vote voltages Vcpu1, Vcpu2, etc. provided to a respective register or register field in the Voltage Control Registers block 5110 of FIG. 13. For example, vote voltage Vcpu1 over time requests 1.20 volts, then 1.10 volts for a while, and then 1.30 volts. Vote voltage Vcpu2 over time requests 1.00 volts, then 0.90 volts, and then 1.30 volts, the values and time instances of request being independent from vote voltage Vcpu1. Also, a separate line is provided for sleep signals, wherein each CPU core CPU1, CPU2, etc. provides a respective independently timed sleep signal CPU1sleep, CPU2sleep, etc.

Further in FIG. 14, another voltage behavior entitled Max Voted Voltage represents the voltage on the output line from the hardware voting circuit 5120 of FIG. 13 at any given time. Thus, over time the output line requests 1.20, 1.10, and then 1.30 volts in a manner determined at each instant of time by taking the maximum (Max) of the vote voltages Vcpu1, Vcpu2, etc. The output SLEEP SIGNAL in FIG. 13 is shown in FIG. 14 as the minimum (MIN) function of the sleep signals CPU1sleep, CPU2sleep, etc. The arbitrating circuit generates the sleep output designated SLEEP SIGNAL and feeds it to control logic 5160 of FIG. 13 for controlling the shared resource (e.g., of supply voltage) when all the processors in the set of potentially-voting processors are asleep in the applicable domain.

The bottom line in FIG. 14 is labeled VDD1 Common Supply Voltage, and represents the actual voltage delivered by the Scalable Voltage Regulator 5170 of FIG. 13 to the voltage domain including the CPU cores CPU1, CPU2, etc. This actual voltage corresponds to the Max Voted Voltage except that when SLEEP SIGNAL is active in FIG. 13, then an actual sleep voltage Vsleep is instead provided to all the CPU cores CPU1, CPU2, etc.

Figure 15:
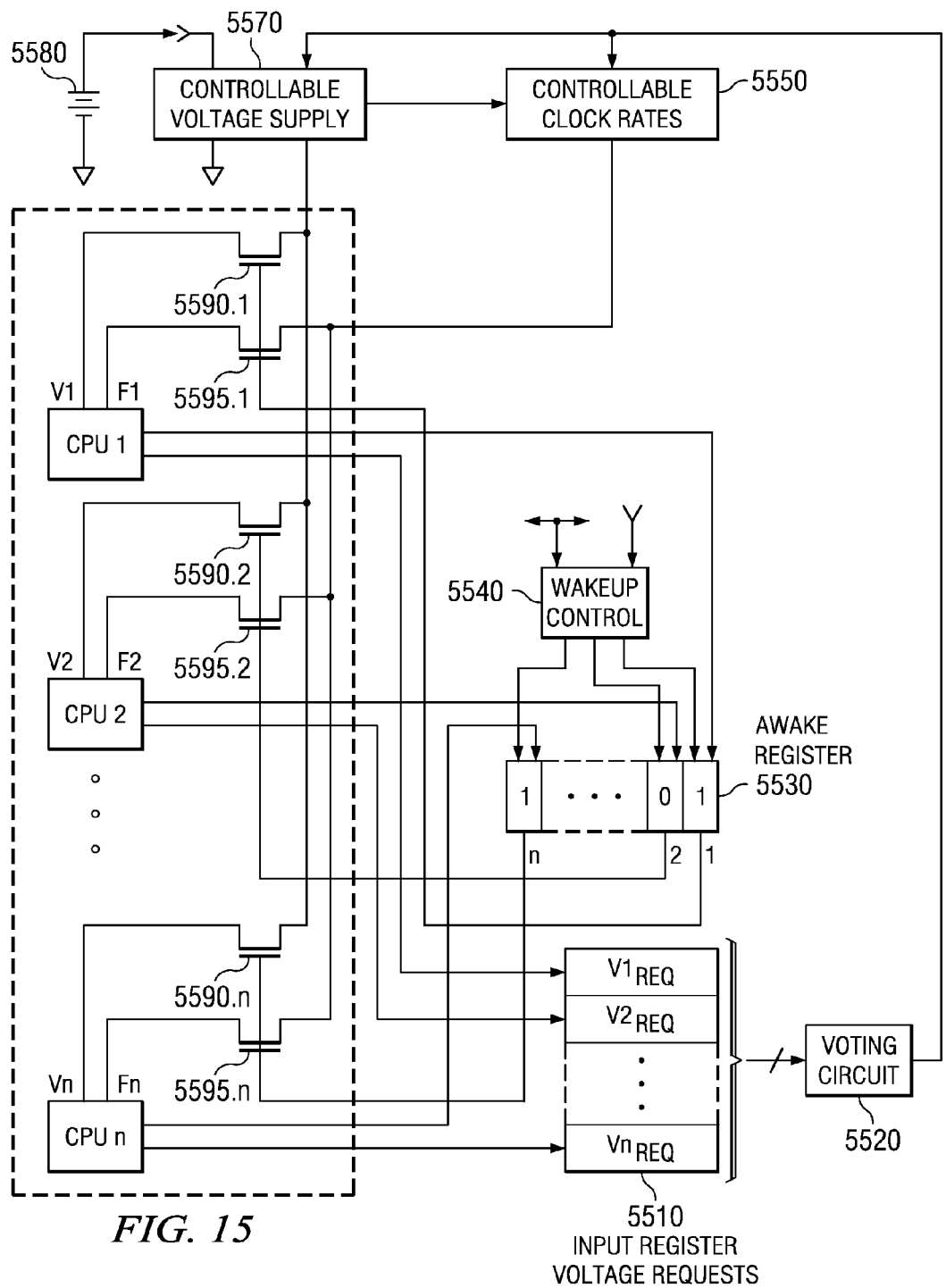
FIG. 15 is a partially-block, partially-schematic diagram of another type of inventive power management circuit combined with a power integrated circuit and CPU cores for the inventive systems of FIGS. 1-7 and 20-22B.

In FIGS. 13 and 15, an Awake Register 5530 is put in the Wakeup Power Domain. The processor cores CPU1, CPU2, ... CPUn are in the MPU Power Domain. In some embodiments, multiple MPU Power Domains or voltage domains for the processor CPU cores are provided to include one or more processor CPU cores in each voltage domain. Each respective one of processor CPU cores enters or writes the wake/not-awake state value for that CPU core in a corresponding field in the Awake Register 5530 in FIG. 15. The processor CPUs each thus have a respective awake/not-awake state and can individually request to be de-energized by Awake Register 5530 controlling transistors 5590.$i$ and 5595.$i$.

The power management circuit of FIG. 15 is responsive to establish the highest of the respective voltage requests of the processors that are in the awake state. The processors have a sleep mode and the power management circuit 5120, 5130 in FIGS. 13 and 5520 in FIG. 15 is responsive to establish the controllable supply voltage output as a function of the sleep mode when the processors are all in the sleep mode and otherwise as a function of the voltage requests of the processors that are not in the sleep mode. Then when any of the processor core becomes not-awake (asleep, standby, retention mode, or other type of very low power mode) and might otherwise lose awake state value stored in that processor core, then the Awake Register 5530 retains and maintains the current awake state of that processor core.

Thus, the power management circuitry includes a control circuit 5590, 5595 that has a register 5530 coupled to a set of two or more processors CPU1-CPUn to indicate an asleep/awake state of each processor and the control circuit 5590, 5595 operable to isolate from the shared resource (e.g. voltage from supply 5570 and/or clock 5550) each processor indicated asleep by the Awake Register 5530. Put another way, the processors have a control for an awake and not-awake state. The voting circuit 5520 has inputs that include a first input from a first processor among the processors and a second input from a second processor among the processors, and the first input is isolated from the control for awake and not-awake state of the second processor, and the voting circuit second input is isolated from the control for awake and not-awake state of the first processor. The voting circuit 5520 is responsive to any awake processor among the processors independently of any not-awake processor among the processors.

In FIG. 15, a block diagram of a power management embodiment includes dedicated registers 5510 for holding voltage requests $V1_{REQ}, V2_{REQ}, \ldots Vn_{REQ}$, from the processors CPU 1, CPU 2 ... CPUn respectively. A hardware voting circuit 5520 has inputs coupled to the registers 5510 to generate an output signal representing the value of the highest one of the voltage requests. A controllable voltage supply circuit 5570 supplies a supply voltage responsive to hardware voting circuit 5520 to the processor cores via respective controlled switching transistors 5590.1, .2, ... n. A battery 5580 provides voltage and energy to the controllable voltage supply 5570, which in turn energizes the applicable processors under control of hardware voting circuit 5520 and an Awake Register 5530.

The Awake Register 5530 is coupled to control circuitry including controlled voltage switching transistors 5590.$i$ and controlled clock switching transistors 5595.$i$. A Wakeup Control circuit 5540 is operable to toggle the Awake register and energize a sleeping processor CPU.

A correspondingly-controllable clock frequency circuit 5550 is responsive to voting circuit 5520 for supplying clock frequencies to the processor cores of various domains via respective switching transistors 5595.1, .2, ... n. The gates of the switching transistors are controlled in pairs 5590.$i$ and 5595.$i$ so that not-awake processor cores are prevented from receiving the supply voltage and a respective clock frequency.

In FIGS. 15 and 7, the clock frequency circuit 5550 is configured and operated for combined DVFS/DPS energy-management as desired for satisfactory power management. Using voting circuit 5520 to call for the maximum or highest voltage requested by any processor in the voltage domain, this means that any requesting processors in the domain that are requesting an operating voltage lower than the maximum is nevertheless run at the maximum by circuit 5570. A first PRCM mode thus uses DVFS combined with DPS at the maximum requested voltage. This first PRCM mode establishes an operating frequency for all active cores in the voltage domain wherein the operating frequency is set for all those cores at the DVFS OPP frequency of FIG. 7 that corresponds to that maximum requested voltage. Since one or more cores may have requested a lower voltage/frequency OPP, they are likely to run their application(s) quickly to completion and save energy by DPS powering them down at completion times respective to each such core.

A second configurable PRCM mode uses a modified DVFS combined with DPS at the maximum requested voltage. This second PRCM mode establishes each operating frequency $f_{CPU}(i)$ for each active core CPUi in the voltage domain according to or approximating the formula $$f_{CPU}(i)=[V_{REQ}(i)/V\text{max}] \times f_{max} \quad (3)$$

An alternative process to formula (3) uses a lookup table of OPP voltage-frequency pairs (V,F) to look up the frequency F corresponding to voltage V requested by active requesting core CPUi and uses that frequency F from the lookup table as the operating frequency $f_{CPU}(i)$ for CPUi. Either way, the second PRCM mode then runs DPS, provided that the application program running on requesting CPUi has a sufficiently lower target frequency than $f_{CPU}(i)$ to save enough leakage energy to justify DPS.

In the second configurable PRCM mode, each core that is requesting $V_{REQ}(i)=V\text{max}$, where Vmax is the maximum voltage that the voting circuit 5520 identifies, is then operated at the DVFS OPP defined by DVFS voltage-frequency pair (Vmax, $f_{max}$). Any core that is requesting $V_{REQ}(i)$ less than Vmax is run at Vmax nevertheless, but gets a lower frequency than $f_{max}$, and thus the second PRCM mode is regarded as having modified DVFS herein. By running each active processor at a frequency related to its requested voltage, the second PRCM mode delivers a useful degree of control over average and peak power consumption, along with a beneficial effect on operating temperature and battery operation of the handset. Moreover, energy savings are conferred by modified DVFS as well whenever all processors request a maximum voltage Vmax that is less than the voltage of the highest DVFS OPP, e.g. OPP4 in FIG. 7.

Accordingly, in some embodiments, power management software determines different controllable clock rates for different processors in the same voltage domain and the output from block 5550 has as many independent parallel clock lines as needed to deliver independently controllable clocks when desired to the different processors CPU 1, CPU 2, ... CPUn respectively via controllable transistors 5595.i.

In FIG. 15, the hardware voting circuit 5520 has a maximum-determination circuit, and the Awake Register 5530 provides disables that prevent voltage from the controllable voltage supply 5570 and controllable clock rates block 5550 from causing leakage current in any not-awake processor cores CPUi. Register entries in Awake Register 5530 are suitably set to some value representing inactivity for each of the not-awake cores, and set to some other value representing activity for each of the awake CPU cores.

Wakeup Control Circuit 5540 is responsive to specified interrupts from interrupt controller 2720 of FIG. 3, to wakeup signals from other integrated circuit devices in FIG. 4, to wakeup signals from elsewhere in the PCRM in FIGS. 3, 6 and 12 such as peripherals, I/Os and Device FSM, and from any awake CPU, and from FIFOs in FIGS. 17A-D. Wakeup Control 5540 is thus able to toggle or alter bits and bit fields in Awake Register 5530 to energize and wake up a sleeping CPU or to de-energize an awake CPU by Wakeup Control Circuit 5540 being external to that CPU.

In some embodiments, the sleep voltage is the same for and applied to a whole chip. Such embodiments handle active voltage, not inactive (sleep) voltage. Other embodiments have sleep/wakeup circuitry for multiple processor cores. The sleep/wakeup circuitry handles the sleep voltage on a shared basis or individual core basis along with the active voltage. In some embodiments wherein sleep voltage is non-zero, the transistors 5590.i, 5595.i are suitably supplemented or replaced with muxes selecting the awake and asleep voltages and wherein the muxes are at least partially controlled by the state of the Awake Register 5530 applicable to the respective CPU core.

In some other embodiments, two PRCMs do sleep control over cores in one or more chips of a D2D system as in FIG. 4. The power management voting circuitry 5520 and Awake Register 5530 circuitry of FIG. 15 is combined with the D2D system of FIG. 4 and the standby and wakeup signals of FIG. 4 are suitably used as sleep/wakeup selector controls in FIG. 15. The circuitry of FIG. 15 in turn is used to apply voting control over the supply voltage applied to cores in one or more chips of FIG. 4.

In FIGS. 16 and 17A-17D, the integrated circuit partitioning enables very efficient DPS for audio playback and screen refresh, which are subject to leakage power dissipation. During screen refresh or audio playback, the rest of the integrated circuit remains most of the time in an Off or Retention low leakage mode wherein only the display domain is On or audio playback circuit is on. The screen or audio circuit is refreshed from its internal FIFO which is sized sufficiently large (e.g. in range 1 Kbytes to 10 Kbytes or larger) to feed the screen or audio circuit independently of the rest of the integrated circuit and thus permits most of the integrated circuit to be in low leakage mode. When that internal FIFO needs to be refilled, a FIFO-fill signal is generated from the internal FIFO and is fed to and automatically wakes up the core domain.

This wakeup process is also herein called a Smart Standby mode, in which the Core domain wakes up automatically and the display can access the frame buffer in external DDR SDRAM memory. The processor MPU, such as one or more CPUs in FIGS. 13 and 15, does not need to wake up on every FIFO-fill signal since the DDR SDRAM controller is built with retention D-flipflops and its configuration is automatically restored. Once the internal FIFO is refilled, the FIFO generates a FIFO-full signal. In response to the FIFO-full signal, the core domain turns off automatically and returns to low leakage mode. When the DDR SDRAM memory is depleted of decoded audio or video, then a wake-up signal is sent to the MPU domain and to Wakeup Control 5540 in FIG. 15 to wake up the MPU to restore the audio decode context, perform additional audio decode at a high rate and re-fill the DDR memory and re-fill the internal FIFO, whereupon the MPU does a DPS context save and returns to low leakage mode.

A Smart Idle mode provides automatic and clean management of the DDR SDRAM memory when shutting down the L3 interconnect or Core domain clock or scaling the L3 clock frequency. In particular, an associated memory refresh controller SDRC of FIG. 3 and FIGS. 17A-C drains the pending access and puts the DDR SDRAM memory in self-refresh before gating the L3 clock or scaling the frequency.

The deployment of DPS is supported by suitable performance prediction software and/or hardware. The software predicts dynamically the performance requirement of the application(s) running on the processor. For DPS, the software accounts for the wakeup latencies overhead due to domain switching so that DPS is operative when such latencies do not significantly impact the performance of the device.

Some embodiments have plural processors (MPU, IVA, etc.) that share the same voltage for hardware simplicity as in FIG. 6 and various voltage request arbitration circuits of FIGS. 8-11, 13, 15 and 18-19. In some of those embodiments DPS is applied to one, some or all processors that are not loaded. In this way, DPS more nearly optimizes power dissipation when one processor is loaded and another processor is not loaded.

In FIGS. 16 and 17A-17D, DPS operations are shown for an audio/video player application. FIG. 16 shows a state transition diagram having states 5810, 5820, 5830, 5840 that respectively correspond to FIGS. 17A, 17B, 17C, 17D. These state machine states identify and generate predetermined power modes or establish power modes specifically to correspond to FIGS. 17A-17D. In state 5810, power is applied to MPU, DSP, Display, S-DMA, Core domain with L3/L4 interconnect and SDRC and GPMC, to P1 and P2 peripheral domains, and to the Wakeup domain WKUP. Audio data is accessed through peripheral P1 domain by MPU and stored in SDRAM, as shown by transfer arrows in FIG. 17A. When this operation is completed a power management transition 5812 is initiated in FIG. 16 and operations reach state 5820.

In state 5820 of FIG. 16, the MPU domain and P1 peripheral domain are put in low power standby mode but the other domains are running in FIG. 17B. Awake Register 5530 of FIG. 15 has bits set to Standby mode for MPU and Awake for DSP. DSP performs two way accesses with SDRAM and decodes the audio data. When this operation is completed, a power management transition 5823 is initiated in FIG. 16 and operations reach state 5830.

In state 5830 and FIG. 17C, the MPU domain and P1 domain continue in low power standby mode, and DSP and Display are put into low power Standby mode, while the other domains are running. Awake Register 5530 indicates standby for both the MPU and DSP. SLEEP_SIGNAL is active in FIG. 13. Now in FIG. 17C the System DMA SDMA transfers decoded audio from SDRAM to a FIFO buffer associated with the P2 peripheral domain. WKUP domain is powered at all times. Notice in FIG. 17C that still more power is saved by having MPU, DSP, Display, and P1 peripheral domains on low power Standby mode. When this operation is completed a power management transition 5834 is initiated in FIG. 16 and operations reach state 5840.

In state 5840 of FIG. 16 and in FIG. 17D, even S-DMA and Core domains are now put on low power Standby mode. The MPU domain, P1 domain, DSP and Display continue in low power standby mode. Now only the P2 peripheral domain and WKUP domain are running. At this point the P2 peripheral domain transfers decoded audio from the P2 FIFO buffer to an off-chip audio codec to play back the audio. Notice in FIG. 17D that still more power is saved by having almost the entire applications processor chip in low power Standby mode.

Further in FIG. 16, transitions are suitably made from any step to the next previous step to refill buffers or do more processing to keep the application going smoothly. For example, when the P2 FIFO buffer in FIG. 17D becomes depleted sufficiently to make replenishment advisable before the buffer becomes empty, then a transition 5843 is made back to step 5830 to refill the P2 FIFO buffer. If more audio needs to be decoded from SDRAM, then a transition 5832 goes back to step 5820 to use the DSP to decode more audio. Awake Register 5530 of FIG. 15 indicates Awake for the DSP and energizes the DSP. If more audio data is needed from the P1 peripheral, then a transition step 5821 goes back to step 5810 for that operation.

Figure 18:
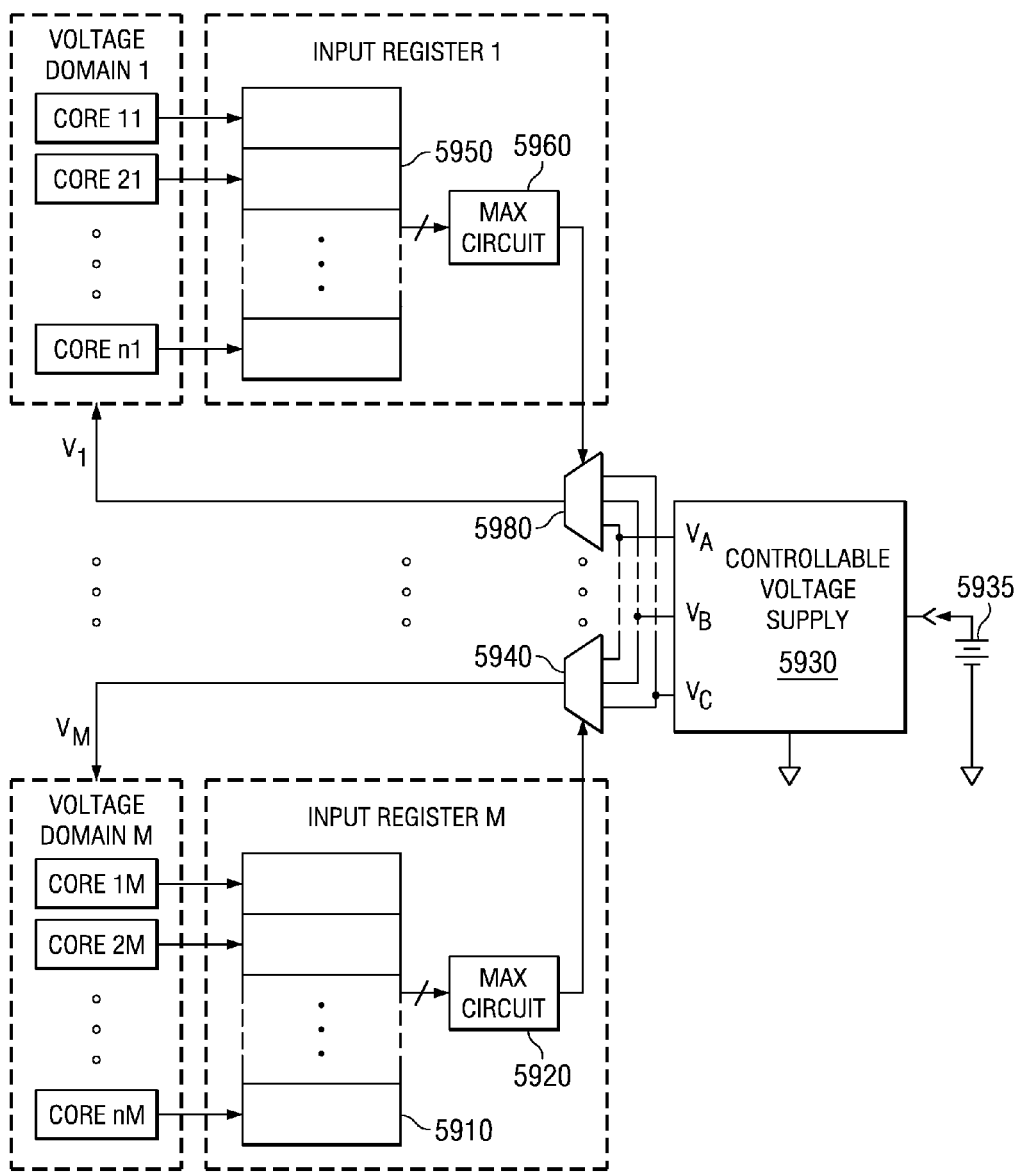
FIG. 18 is a block diagram of another type of inventive power management voting circuit combined with a power integrated circuit and CPU cores for the inventive systems of FIGS. 1-7 and 20-22B.

In FIG. 18, another embodiment provides plural sets of cores in plural voltage domains. Voltage domain 1 has Core 11, Core 21, ... Core n1 all fed with a voltage $V_1$. An M-th voltage domain M has Core 1M, Core 2M, ... Core nM all fed with a voltage $V_M$. Each Voltage domain has a set of Input Registers such as 5910 analogous to Voltage Control Register 4610 of FIG. 9. A Max Circuit 5920 responds to the contents of the Input Registers 5910 to deliver a Maximum Voted Voltage as a selector control. A shared controllable voltage supply 5930 is fed from a battery 5935 or other voltage source. Shared controllable voltage supply 5930 feeds controlled voltages $V_A, V_B, V_C$ to respective inputs of both a first voltage delivery mux 5940 and a second voltage delivery mux 5980. Mux 5940 is responsive to the selector control from Max Circuit 5920 to deliver a selected voltage $V_M$ (selected from the voltages $V_A, V_B, V_C$) to M-th voltage domain M, and Mux 5980 analogously delivers voltage $V_1$ to voltage domain 1. In voltage domain 1, Input Registers 5950 feed contents to a Max Circuit 5960 which outputs a maximum voted voltage as a selector control to mux 5980. Other muxes like 5940 and 5980 are analogously provided and controlled to respectively deliver voltage to each voltage domain to which the embodiment is applied in the system. The muxes 5940 and 5980 are also suitably provided with inputs for one or more sleep voltages from controllable voltage supply 5930, and some of the selector lines to control the muxes 5940 and 5980 are fed from an Awake Register 5530 combined as in FIG. 15.

Figure 19:
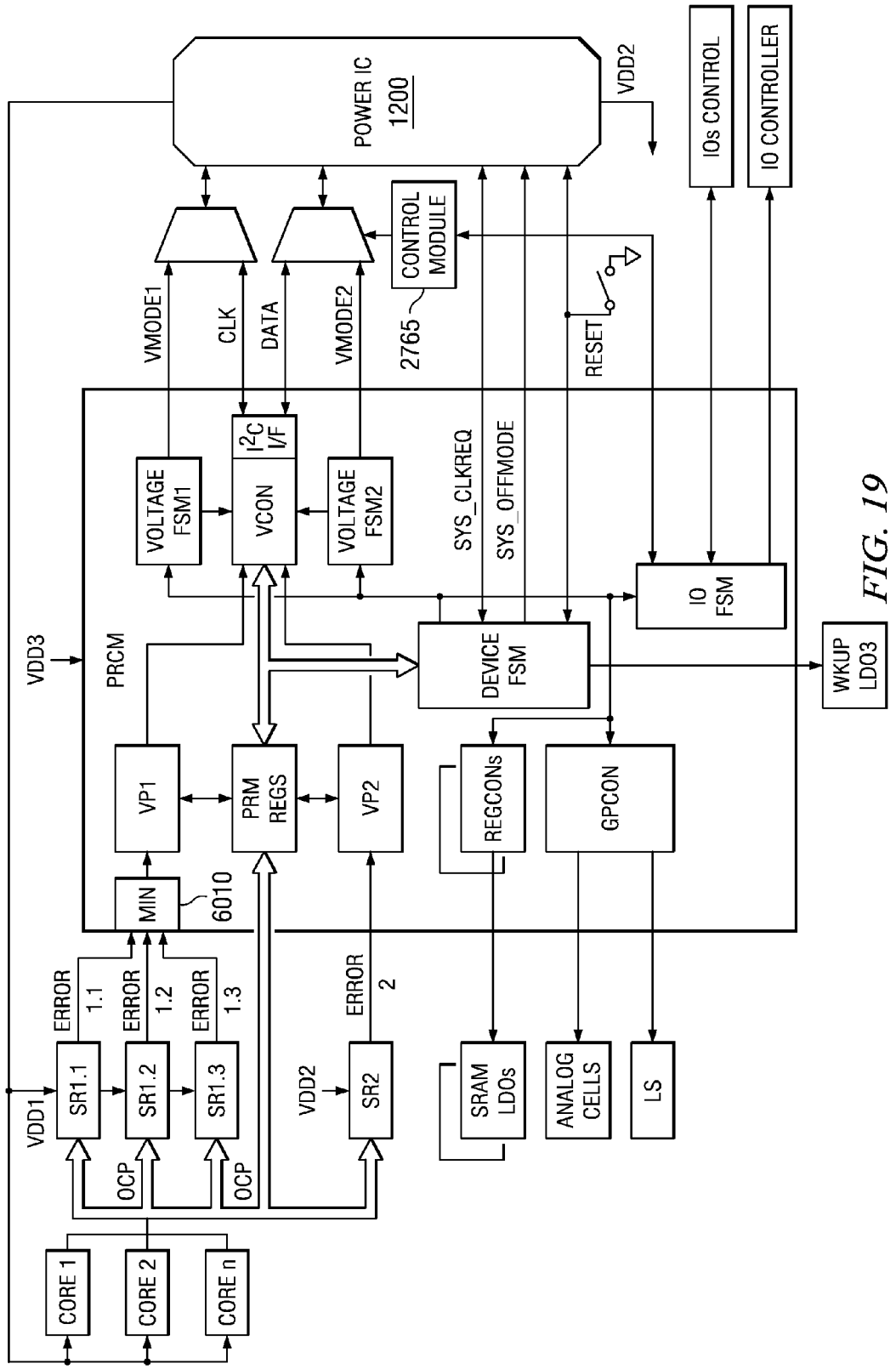
FIG. 19 is a block diagram of another type of inventive power management voting circuit combined with a power integrated circuit and CPU cores for the inventive systems of FIGS. 1-7 and 20-22B.

In FIG. 19, yet another embodiment uses a minimum-determination voting circuit 6010 to determine the least error output from three sensor units SR1.1, SR1.2, SR1.3. The sensor units SR1.*i* are configurable via OCP bus couplings. In this way, the particular CPU core which is sensed to need the most voltage among the cores CORE1-COREn, as indicated by the minimum error of the various error outputs, determines the AVS voltage VDD1 to be delivered to all the CPU cores CORE1-COREn. The output of minimum-determination voting circuit 6010 is coupled to a voltage processor VP1 of FIG. 12. The electronic circuitry thus provides plural sensor circuits providing respective errors and wherein the arbitrating circuit, such as 6010, generates a minimum of the respective errors.

Another part of the integrated circuit has a sensor unit SR2 which provides an Error2 directly to a voltage processor VP2. In some embodiments, a set of sensor units SR2.*i* and another minimum-determination voting circuit like circuit 6010 is used to supply an error output to the voltage processor VP2. Further sensor units SR3.*i*, SR4.*i*, etc. and corresponding voltage processors VP3, VP4, etc. are provided in some further embodiments according to the degree of sophistication of the power management which is desired. Other structures in FIG. 19 are drawn analogous to those of FIG. 12 to facilitate comparison with FIG. 12.

FIGS. 20-22B show some hardware security embodiments for symmetric multiprocessing (SMP) core(s) for use in the systems of FIGS. 1-19. One of the cores is called the SMP core. A hardware (HW) supported secure hypervisor runs at least on the SMP core. Linux SMP HLOS (high-level operating system) is symmetric across all cores and is chosen as the master HLOS in some embodiments. A secure environment is provided by use of a secure state machine SSM 6135 in FIG. 22B (compare SSM 2460 of FIG. 3). A core CPU0 acts as a control core and is provided with security zone circuitry so that the security zone is asymmetric in the multi-core embodiment. The hardware-protected hypervisor mechanism provides standalone CPU virtualization in order to run a single processor based OS such as WinCE or Nucleus.

The hypervisor code runs in a secure privilege mode called Monitor Mode, and virtual worlds are switched from Monitor Mode. Hypervisor-mediated categories (e.g., Public Non-virtual, Public Virtual, Secure Non-virtual or Secure Virtual) are scheduled by timers in synchronous time sharing fashion. The HW secure hypervisor mechanism in this embodiment is asymmetric relative to the processor cores.

In some other embodiments, a pseudo-symmetric architecture has virtual processors wherein any of the virtual processors can do SMP (symmetric multi-processing) while using a control core plus a further number n–1 (one less than n) CPU cores, also called processor cores herein. In other words, if a complete cluster has four (4) cores or processors, then the pseudo-symmetric virtual core mechanism uses an SMP cluster of 3 CPUs as processor cores with some operations conducted by the additional control core CPU0.

Figure 20:
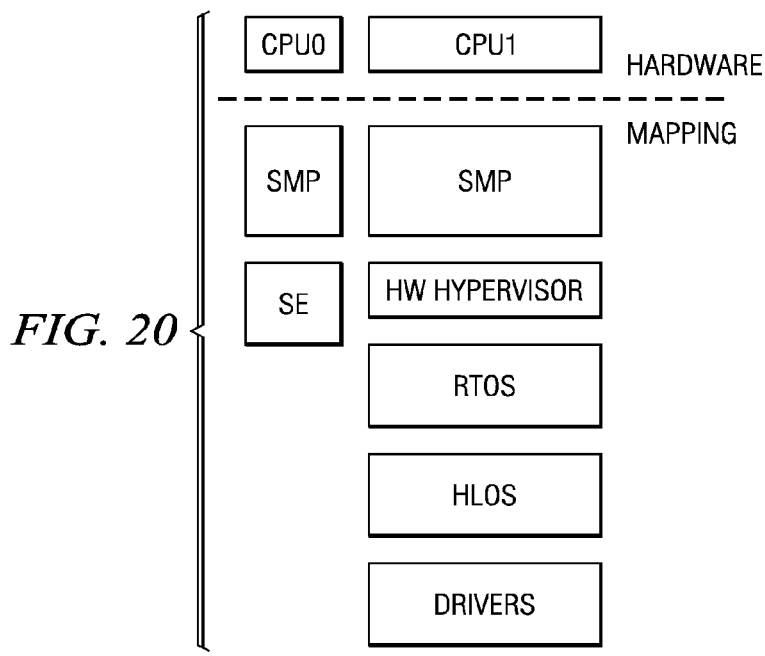
FIG. 20 is a block diagram of a dual-core multi-processing system combination having inventive power management herein.
Figure 21:
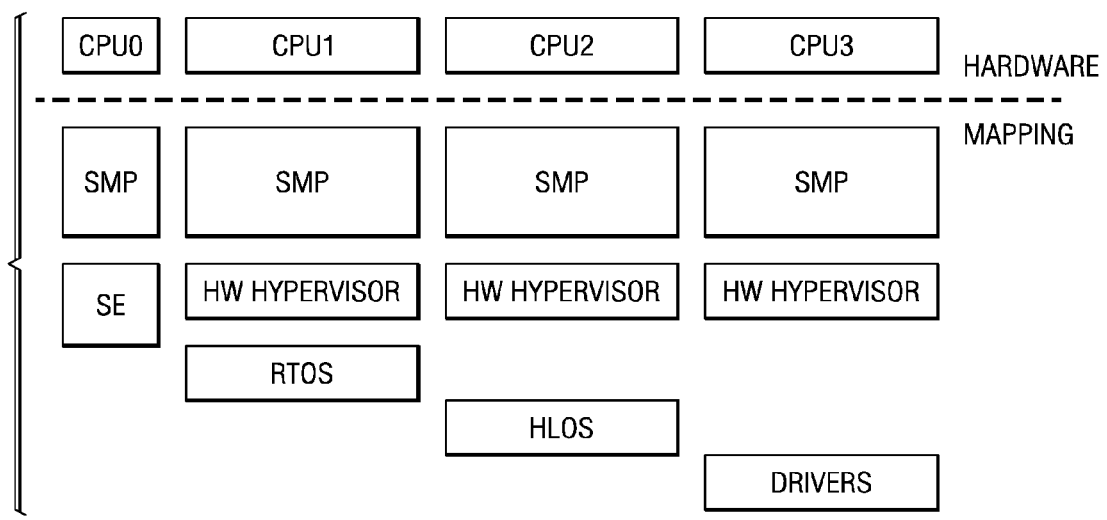
FIG. 21 is a block diagram of a quad-core multi-processing system combination having inventive power management herein.

In FIGS. 20 and 21, the hardware protected hypervisor provides real time interrupt firing capability for virtual worlds to ensure RTOS capability. An OS running in a virtual world is able to call Secure services even if the secure environment is on CPU0 and the virtual world is running on another CPU. The security mechanism and hypervisor mechanism are invisible or transparent to the SMP HLOS.

In some embodiments, the secure zone is implemented on all CPUs of the cluster. The Secure Kernel and its secure services run specifically on CPU0, which operates as a master CPU. CPU0 is the first CPU core to boot and to setup or configure a secure hypervisor structure. CPU cores other than CPU0 have a small secure kernel that includes a Monitor Mode implementation to forward Secure fast interrupt SFIQ generated by a virtual OS kernel (WinCE, RTOS). SFIQ from other cores is coupled and conveyed to the secure hypervisor in Monitor Mode operating on the master CPU0 core, which executes or drives hypervisor scheduling. The hypervisor scheduling on master CPU0 core is unnecessary on the other CPU cores, which simplifies this embodiment. The Security Monitor bus SECMON interface is accessible by the SSM 2460, 6135 for all the CPU cores. Some interrupt-related instructions are trapped into Monitor Mode as a SWI software interrupt exception, if and as-configured on a CPU-specific basis.

All the watchdog timers WDT and other Timers operate in a synchronous mode, and are either synchronous at the same clock rate or clock frequency or run at clock rates that are exact multiples of each other and have coinciding clock edges at the lower or lowest clock rate. All watchdog timers WDT and other Timers are programmable by CPU0 to support the hypervisor scheduling.

FIG. 20 shows a dual-core embodiment that has the same one SMP HLOS running on all CPU cores. Each CPU has SSM hardware and Monitor code to constitute a hardware-supported hypervisor. The hypervisor shares its bandwidth between the SMP HLOS and another world in the following way. CPU0 is shared between SMP HLOS and Secure Environment using the secure zone. CPU1 is shared between SMP HLOS and Modem RTOS and a Public HLOS (e.g., WinCE operating system, non-real-time or other operating system) using the secure zone plus SSM hardware hypervisor structuring.

In each world there is a small secure service routine for transmitting a secure service request to CPU0 where the Monitor Mode is located in the Secure environment of CPU0 and provides hypervisor operation.

FIG. 21 shows an overview of a four-CPU embodiment having the same one SMP HLOS running on all four CPU cores. Each CPU has hardware-supported hypervisor to share its bandwidth between the SMP HLOS and another world in the following manner. CPU0 is shared between SMP HLOS and Secure Environment using a secure zone. CPU1 is shared between SMP HLOS and Modem RTOS using a secure zone plus SSM hardware hypervisor structuring. CPU2 is shared between SMP HLOS and Public HLOS using secure zone plus SSM hardware hypervisor structuring. CPU3 is shared between SMP HLOS and drivers such as non-GPL drivers using secure zone plus SSM hardware hypervisor structuring.

Figure 22A:
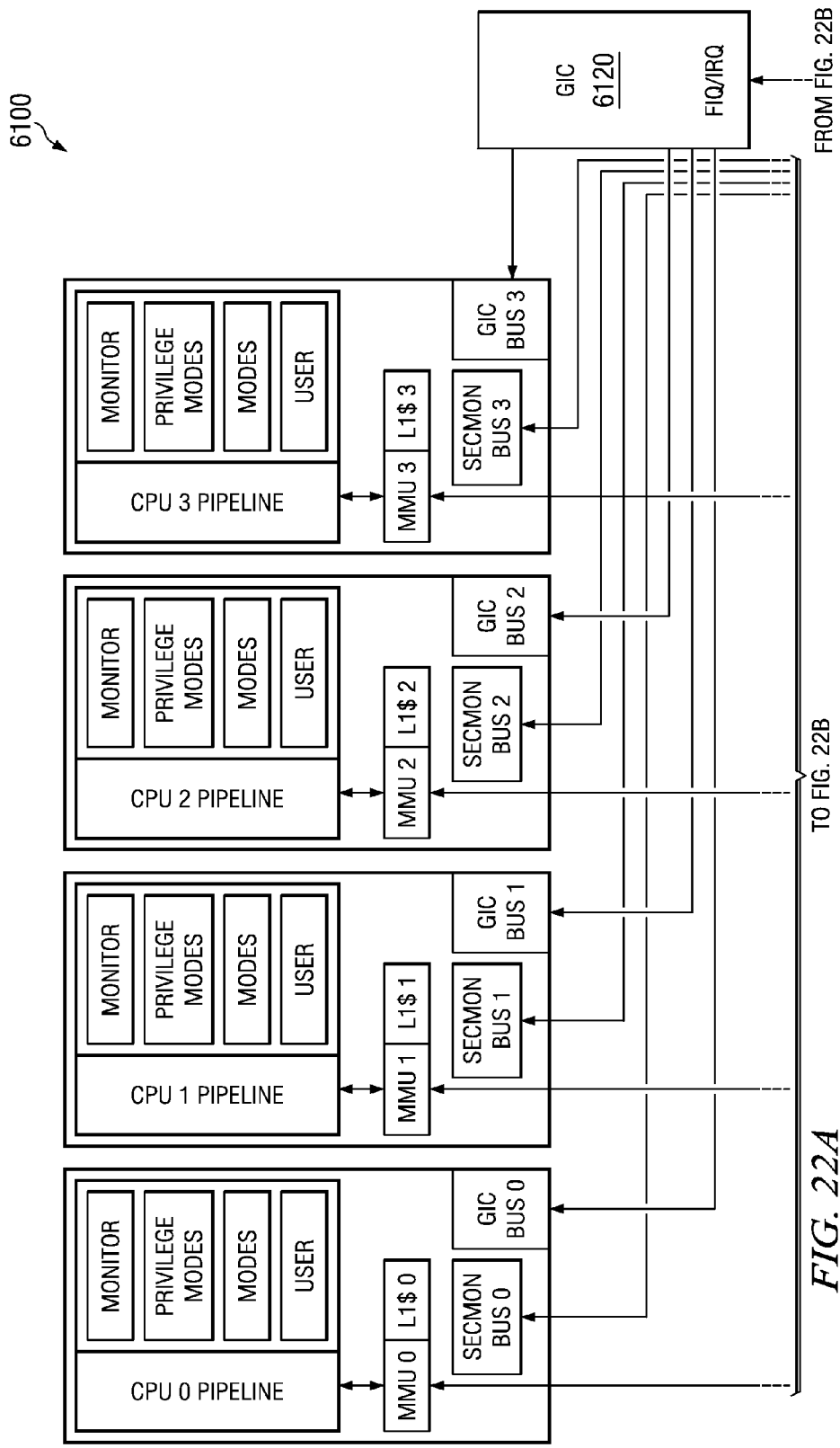

Expanding on FIG. 21, each CPU of FIGS. 22A-22B has a small amount of secure code for transmitting a secure service request to CPU0 where the Monitor Mode is located in the Secure environment of CPU0 and provides hypervisor operation. The hypervisor operation and hardware support by SSM ensure the security robustness of the virtual modes. Each of the cores CPU0-3 has a respective Security Monitor bus (SECMON), a pipeline, and circuitry for establishing various privilege modes such as Monitor, Supervisor, System, FIQ mode, IRQ mode, Abort mode, Undefined mode, and at least one non-privilege mode such as a User mode.

In FIGS. 22A and 22B, a four-CPU hardware-supported hypervisor embodiment 6100 of FIG. 21 is shown in more detail. Non-virtual Public HLOS and Non-Virtual Secure Kernel run in the system as coherent and shared devices with MMU (Memory Management Unit) for each of the CPUs (CPU0-3), L1$ (Level 1 Cache) for each of the CPUs (CPU0-3), and a shared Snoop Control Unit SCU 6110. Public Virtual OS (WinCE, Nucleus, etc.) runs non-coherently and as a not-shared device with an MMU.

The Interrupt architecture, for example, optionally has dedicated SFIQ input for Secure Fast Interrupt Request. IRQ are reserved for SMP HLOS. Public FIQ can be used with SMP HLOS of Public Non-virtual mode. Other modes (Public Virtual, Secure Non-virtual and Secure Virtual) use exclusively Secure FIQ to preempt the SMP HLOS.

In FIG. 22A, a block called a Generalized Interrupt Handler GIC 6120 is provided to handle interrupts to and from respective GIC Bus 0-3 ports corresponding to each of the CPU cores CPU0-3. In FIG. 22A, each interrupt line from various interrupt lines is tagged to the Public Normal, Public Virtual, Secure Normal or Secure Virtual mode. The Secure zone (SZ) traps any FIQ in Monitor Mode. A minor latency of the FIQ (fast interrupt request) has negligible effect on the SMP HLOS performance. The Monitor code is written to identify which category (Public Non-virtual, Public Virtual, Secure Non-virtual or Secure Virtual) to which the FIQ belongs. To do this, the Monitor code reads the Interrupt Handler GIC 6120 and qualifier MreqSecure (Secure or Public FIQ) and then reads the SSM qualifier MreqSystem (Non-virtual or Virtual). (Refer to discussion of FIG. 3). Using the identified mode information, the Monitor code switches operations to a specific processor CPU.

Further in FIG. 22B, SSM hardware has hypervisor protection circuitry 6130 that includes registers 6135 and logic for a Virtual Checker 6145, a Physical Checker 6155, and a Virtual Modes Creator 6175. See incorporated patent application TI-61985, "Virtual Cores And Hardware-Supported Hypervisor Integrated Circuits, Systems, Methods and Processes of Manufacture," Ser. No. 11/671,752, filed Feb. 6, 2007, which is hereby incorporated herein by reference. Registers 6135 include virtual processor-related registers for each virtual processor x to be used. These are respectively designated VPx_Debug_Dis for debug disable, VPx_NS for virtual processor-specific secure state or non-secure state, VPx_Active for active or inactive status, and VPx_Boundaries for begin/end addresses to define address space(s) assigned to the virtual processor indexed x. These registers are used to activate and define each virtual processor.

In FIG. 22B Virtual Checker 6145 checks that the currently-active virtual modes execute properly in their own virtual address spaces. Virtual Checker 6145 includes a CPSR_Mode switch checker and a Per-CPU Preemptive Masking circuit for each CPU0-3. Virtual Checker 6145 has inputs from CPU0-3 (index i=0, 1, 2, 3) for CPUi_Trace_Virtual_Address, CPUi_CPSR_Mode, and CPU_CPSR_< > fields or bits CPSR_I for masking interrupts IRQ, CPSR_F for masking fast interrupts FIQ, and for External Abort EA. Virtual Checker 6145 has four outputs coupled to GIC 6120 of FIG. 22A. The outputs signify fast interrupt mask enables CPUi_FIQMASK and pertain respectively to the several CPU i.

Also in FIG. 22B, an Error Generator 6150 receives an Abort request SRESP from the Physical Checker 6155 in the same clock cycle in which a physical check violation occurs. Physical Checker 6155 checks that the virtual processors execute properly in their own physical address space and that other running cores are not injecting data or code into address spaces reserved for other virtual processors that are running or not. Error Generator 6150 is coupled to a Read channel and a Write channel of one or more functional buses emanating from Snoop Control Unit SCU 6110 of FIG. 22A.

In the embodiment of FIG. 22B, the Read channel and Write channel are coupled via Error Generator 6150 to a level-two cache L2$ 6160. Physical checker 6155 checks the address and other signals on the Read channel and Write channel on the L2$ side of the Error Generator 6150. L2$ 6160 is further coupled to a bus interface MPU2BUS 6165.

Virtual Modes Creator 6175 protects and generates respective CPU-specific MreqSystemX qualifiers for each CPU indexed X. For example, if three (3) worlds are identified (HLOS, RTOS), then two (2) MreqSystemX qualifiers are provided to interface MPU2BUS 6165 on the same clock cycle in which the debug status arises. For virtual modes that have debug activated in registers 6135, the Virtual Modes Creator 6175 generates an MreqDebug qualifier and conveys it to interface MPU2BUS 6165 on the same clock cycle in which the debug status arises.

In FIG. 22B, the MreqSystemX qualifiers together with qualifiers MreqType, MreqPrivilege, MreqDebug, MreqSecure are relayed or generated by interface MPU2BUS 6165 and sent onto interconnects 6170 for each virtual processor or OS. Interconnects 6170 are coupled to various Firewalls 6180A, B, . . . Z (analogous to firewalls in FIG. 3), and are further coupled to respective Timers CPUiTimer 6185.0, .1, .n respective to the various CPUs indexed i from CPU0 to CPUn. The timers 6185.i are responsive to a common clock or counter 6188.

A Security Violation Handler 6190 is responsive to any security violation(s) detected in Virtual Checker 6145, Physical Checker 6155, and Virtual Modes Creator 6175. The Security Violation Handler 6190 provides appropriate security violation response output(s) such as delivering reset control to a PRCM 6195. PRCM 6195 has power management circuitry as shown in FIGS. 5-19 described elsewhere herein, to control the voltage and clock for the various processors CPU0-CPU3. In this way SSM HW Hypervisor structures the multi-CPU system to that Monitor Mode of CPU0 operates as a hypervisor.

The SSM 6130 implements all the registers and logic for providing exclusive or cooperating debug between CPUs and virtual OS (WinCE, Nucleus). The SSM 6130 differentiates for each interrupt the mode or world (Public Non-virtual, Public Virtual, Secure Non-virtual or Secure Virtual) to which the interrupt belongs.

In the GIC (Generalized Interrupt Handler) 6120 of FIG. 22A, some interrupt requests are dedicated to SMP HLOS. Public Fast Interrupt Requests PFIQ can be used by the SMP HLOS. The GIC IRQs and FIQs of FIG. 22A are independent of and separate from control lines between PRCM 6195 and the processors CPU0-CPU3 as further detailed in FIGS. 10, 13, and 15 used as further detail of FIG. 22B here, and separate from the serial path between PRCM 6195 and power IC 1200 of any of those FIGS. 10, 13, and 15 combined with FIG. 22B. The independence and separation provide a performance-efficient, fast parallelism.

Secure Fast Interrupt Requests SFIQ are dedicated to Secure Environment and Virtual worlds. The GIC 6120 differentiates the Public or Secure nature of each interrupt via a dedicated register having retention flip flops identifying the Public or Secure assignment of the corresponding interrupt line. Configuration of an interrupt configuration register is accessible only by secure privilege data accesses such as at boot time. Each interrupt line that is identified or configured in the register as secure is also made fast interrupt FIQ.

In FIG. 22B, synchronous timer scheduling makes all CPU timers synchronous relative to each other in order to facilitate scheduling and to efficiently schedule the different worlds. Also, the timers are made configurable through an interface that is responsive to qualifier MreqSystemx, where index x on the qualifier identifies the CPUx that is attempting an access. This protects the virtual world setting from tampering.

The timers 6185.i output two interrupts per CPUi, a first interrupt for the SMP HLOS and a second interrupt for the virtual world running on the CPUi or secure mode. On a dual core scheme where multiple virtual worlds are evolving on a single CPUi, software is made to have only the Secure mode own the timers 6185.i (for virtual worlds). In this way, the secure hypervisor dispatches or allocates CPU bandwidth correctly between worlds.

The timers 6185.i are banked so that SMP HLOS programs its own setting. Then each virtual processor VPx or secure mode programs its respective setting into a timer bank register. The timer bank register is protected by a firewall.

Figure 23:
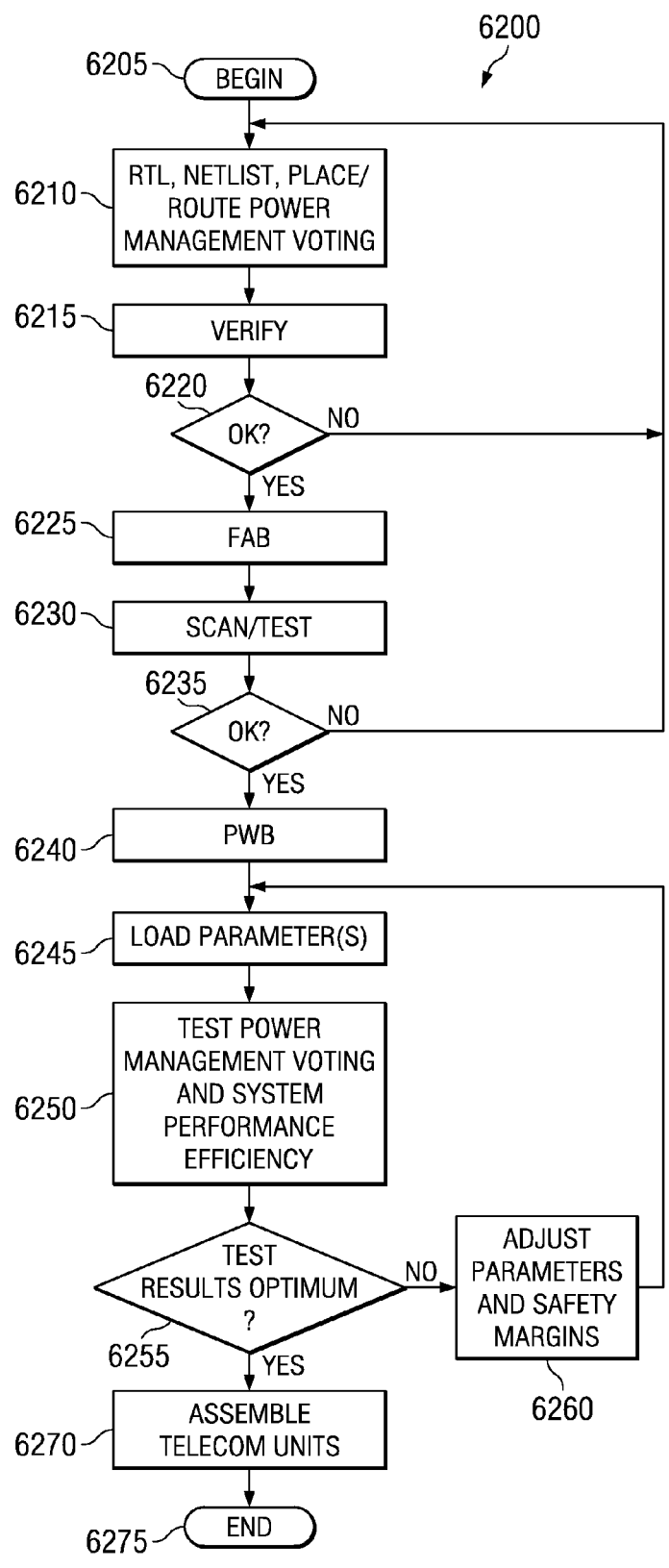
FIG. 23 is a flow diagram of an inventive process of manufacturing various embodiments.

In FIG. 23, various embodiments of an integrated circuit improved as described herein are manufactured according to a suitable process of manufacturing process 6200 as illustrated in the flow of FIG. 23. The process begins at step 6205. A step 6210 prepares RTL (register transfer language) and netlist for a particular design of one or more integrated circuits or a system as described and/or shown in one or more of the Figures. Power management is accomplished through a voting system involving specific voltages from various cores or sensor errors pertaining to various cores.

In a step 6215, the design of configurable power management voting circuitry for voltage and clock control by combined DVFS/DPS/SLM/AVS, for instance, is verified in simulation electronically on the RTL and netlist. In this way, the contents and timing of the registers, operation of the circuits in response to various configurations and uses of the registers, are verified. Compliance with power module dependencies, and response to conditions for invoking DVFS, DPS, SLM, AVS and combinations thereof are verified. The operations are verified pertaining to real-time and non-real-time operations and interrupts, and transitions through handlers, Monitor Mode, Secure Privilege modes, User mode, Debug modes, power management, sleep/wakeup, and various attack scenarios. Then a verification evaluation step 6220 determines whether the verification results are currently satisfactory. If not, operations loop back to step 6210.

If verification evaluation 6220 is satisfactory, the verified design is provided in a manufacturing-ready form on a design information media, such as a design dataset, pattern generation dataset or the like, and fabricated in a wafer fab and packaged to produce a resulting integrated circuit at step 6225 according to the verified design. Thus, a process of manufacturing an electronic circuit includes fabricating a set of processors coupled to respective resource control registers responsive to multi-bit resource requests from the processors together with an arbitrating circuit responsive to the shared resource control registers to output a multi-bit value representing an arbitrated resource level.

The process of manufacturing further includes a step 6230 that tests power management for the electronic circuit by supplying a controllable voltage for the set of processors, operating each processor to make respective voltage requests as the multi-bit resource requests, and arbitrating the voltage requests to automatically control the controllable voltage to establish the highest magnitude of the respective voltage requests. Sleep/wakeup circuitry is tested. Step 6230 verifies the operations directly on first-silicon and production samples such as by using scan chain methodology on power management circuitry and other circuitry of the actual chip. An evaluation decision step 6235 determines whether the chips are satisfactory, and if not satisfactory, the operations loop back as early in the process such as step 6210 as needed to get satisfactory integrated circuits.

Given satisfactory integrated circuits in step 6235, a system unit is manufactured, such as any one, some or all of those system units shown together in FIG. 1 or otherwise based on teachings herein. The process prepares in a step 6240 a particular design and printed wiring board (PWB) of the system unit. For instance, the system unit, for example, can have a modem, a processor coupled to a modem, a configurable control register, a controlled power management circuitry, peripherals coupled to the processor, and a user interface coupled to the processor. In a step 6245 a storage, such as SDRAM and Flash memory and on-chip secure memory, is coupled to the system and is provided with configuration and other parameters and a real-time operating system RTOS, Public HLOS, protected applications (PPAs and PAs), and other supervisory software.

The particular design of a power management voltage voting embodiment is tested in a step 6250 by electronic simulation and prototyped and tested in actual application. Operations of the power management voltage voting circuits by selectively activating fields of a configurable control register, for instance, are verified to confirm operations of the integrated circuit(s) and system and to perform verification and test operations that include and/or augment the verification operations described at step 6215 earlier in the process. The verification and test operations pertaining to real-time and non-real-time operations, power management, various real-time scenarios as are specified for the system. Further testing evaluates and confirms system stability and performance, power management voltage voting performance and efficiency and satisfactory operation of mobile video display, phone, e-mails/data service, web browsing, voice over packet, content player, camera/imaging, video, microcontroller, and other such operation that is apparent to the human user and can be evaluated by system use. Also, various attack scenarios are applied in the test operations, such as by using real viruses, DoS denial of service attacks, security hacks, and other attacks.

In a step 6260, parameters of the power management circuitry, software and system are adjusted for in faster application execution, lower power dissipation, QoS (quality of service) for each communications service processed, and other pertinent metrics. Examples of parameters include enable/disable register bits in Control Registers and specified DVFS OPPs. If further increased efficiency is called for in a step 6255, then adjustment or reconfiguration of the parameter(s) and safety margins is performed in the step 6260, and operations loop back to reload the parameter(s) at step 6245 and do further testing. When the testing is satisfactory at step 6255, operations proceed to step 6270.

In manufacturing step 6270, the adjusted parameter(s) are loaded into the Flash memory or otherwise established in the integrated circuit(s) of the system. The components are assembled on a printed wiring board or otherwise as the form factor of the design is arranged to produce resulting system units according to the tested and adjusted design, whereupon operations are completed at END 6275.

Various embodiments are used with one or more microprocessors, and each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other micro-control blocks using any one or more of the foregoing.

Various embodiments are implemented in any integrated circuit manufacturing process such as different types of CMOS (complementary metal oxide semiconductor), SOI (silicon on insulator), SiGe (silicon germanium), organic transistors, and with various types of transistors such as single-gate and multiple-gate (MUGFET) field effect transistors, and with single-electron transistors and other structures. Photonic integrated circuit blocks, components, and interconnects are also suitably applied in various embodiments.

While some embodiments may have an entire feature totally absent or totally present, other embodiments, such as those performing the blocks and steps of the Figures of drawing, have more or less complex arrangements that execute some process portions, selectively bypass others, and have some operations running concurrently sequentially regardless. Accordingly, words such as "enable," "disable," "operative," "inoperative" are to be interpreted relative to the code and circuitry they describe.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Various embodiments of the invention employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. An electronic circuit comprising:
    a first voltage domain comprising a first set of processors operable to make respective voltage requests;
    a power management circuit having a first controllable supply voltage output coupled to said first set of processors and further having a first voting circuit responsive to the voltage requests of the first set of processors and operable to automatically establish a function of the respective voltage requests of the first set of processors to control the first controllable supply voltage output; and
    a second voltage domain comprising a second set of processors operable to make respective voltage requests;
    wherein said power management circuit has a second controllable supply voltage output coupled to said second set of processors and further having a second voting circuit responsive to the voltage requests of the second set of processors and operable to automatically establish a function of the respective voltage requests of the second set of processors to control the second controllable supply voltage output;
    wherein said power management circuit is operable for having the first controllable supply voltage output provide a voltage level different from a voltage level of the second controllable supply voltage output; and
    wherein each processor in said first set of processors has a respective state operable as an awake state or as a not-awake state, and said power management circuit is responsive to establish the highest of the respective voltage requests of the first set of processors that are in the awake state and for isolating from the first controllable supply voltage output any subset of said first set of processors having a not-awake state.

2. The electronic circuit claimed in claim 1 wherein said power management circuit has at least one register, and said first set of processors are operable to send their respective voltage requests as multi-bit voltage magnitude representations to said at least one register.

3. The electronic circuit claimed in claim 1 wherein said first set of processors have a sleep mode and said power management circuit is responsive to establish the first controllable supply voltage output as a function of the sleep mode when said first set of processors are all in the sleep mode and otherwise as a function of the voltage requests of said first set of processors that are not in the sleep mode.

4. The electronic circuit claimed in claim 1 wherein said power management circuit also controls a clock frequency for said processors.

5. The electronic circuit claimed in claim 1 wherein at least one of said processors in said first set of processors is operable to execute a dynamic voltage and frequency scaling (DVFS) power management process to output its voltage request to said first voting circuit, wherein the DVFS power management process comprises a plurality of voltage/frequency operating performance points, each of the points having a respective non-zero voltage and non-zero frequency value differing from any other of the points and for delivering operation of the at least one processor of said first set of processors to perform the tasks currently-demanded of the at least one processor.

6. An electronic circuit comprising:
    a first voltage domain comprising a first set of processors operable to output respective voltage requests and a second voltage domain comprising a second set of processors operable to output respective voltage requests;
    a voltage supply having a first controllable voltage supply output coupled to said first set of processors and a second controllable voltage supply output coupled to said second set of processors; and
    a voting circuit having respective inputs coupled to said first set of processors and to said second set of processors, said voting circuit having a voltage control output coupled to said voltage supply, said voting circuit operable in response to the respective inputs of the first set of processors to automatically scale the first controllable voltage supply output from said power supply substantially to a highest of the voltage requests of the first set of processors and said voting circuit operable in response to the respective inputs of the second set of processors to automatically scale the second controllable voltage supply output from said power supply substantially to a highest of the voltage requests of the second set of processors; and
    circuitry for providing a first frequency level to a first processor in said first set of processors and at a same time providing a second frequency level for a second processor in said first set of processors, wherein the first frequency level is less than the second frequency level.

7. The electronic circuit claimed in claim 6 wherein said voting circuit has respective register fields for the input from each processor of said first set of processors and each said processor of said first set of processors is operable to write its respective voltage request into a corresponding said register field.

8. The electronic circuit claimed in claim 6 wherein said processors of said first set of processors have a respective interrupt input, and said voting circuit inputs are independent from each such interrupt input.

9. The electronic circuit claimed in claim 6 wherein said first set of processors are operable for inter-processor communication, and said voting circuit controls said voltage control output separate from inter-processor communication.

10. The electronic circuit claimed in claim 6 wherein said voting circuit is responsive to any awake processor among said first set of processors independently of any not-awake processor among said first set of processors.

11. The electronic circuit claimed in claim 6 wherein said first set of processors have a control for an awake and not-awake state, and said voting circuit inputs include a first input from a first processor among said first set of processors and a second input from a second processor among said first set of processors, and said first input is isolated from said control for awake and not-awake state of said second processor, and said voting circuit second input is isolated from said control for awake and not-awake state of said first processor.

12. The electronic circuit claimed in claim 6 wherein at least two of said processors in any of said first or second set of processors have a different architecture from each other.

13. The electronic circuit claimed in claim 6 wherein the first frequency level is provided at a rate responsive to a relationship of a voltage request of the first processor relative to a voltage request of the second processor.

14. The electronic circuit claimed in claim 6 wherein the first frequency level is provided at a rate responsive to a ratio of a voltage request of the first processor relative to a voltage request of the second processor.

15. An electronic circuit comprising:
a first set of processors that use a first shared resource for operation of said first set of processors, the first shared resource having a plurality of resource levels;
a second set of processors that use a second shared resource for operation of said second set of processors, the second shared resource having a plurality of resource levels;
a set of shared resource control registers coupled to said first set of processors and to said second set of processors, at least two of said shared resource control registers operable to store respective multi-bit values representing respectively requested levels among the plurality of resource levels, said first set of processors each operable to supply a respective multi-bit value to at least one of the corresponding shared resource control registers and said second set of processors each operable to supply a respective multi-bit value to at least one of the corresponding shared resource control registers; and
an arbitrating circuit coupled to said shared resource control registers and responsive to output a first multi-bit value representing an arbitrated first resource level of the shared resource to said first set of processors and to output a second multi-bit value representing an arbitrated second resource level of the shared resource to said second set of processors;
and
further comprising a control circuit including a register coupled to said first set of processors to indicate a respective asleep or awake state of each processor and said control circuit operable to isolate from the shared resource each processor indicated asleep by said register.

16. The electronic circuit claimed in claim 15 further comprising a scalable resource controller responsive to said arbitrating circuit to deliver the shared resource to the first set of processors at substantially the arbitrated resource level of the shared resource represented by the multi-bit value output from said arbitrating circuit.

17. The electronic circuit claimed in claim 16 further comprising a serial communication circuit coupling said arbitrating circuit to said scalable resource controller.

18. The electronic circuit claimed in claim 15, further comprising an address decoder coupled to said first set of processors, said first set of processors each operable to supply a respective address to said address decoder, said address decoder operable to select said at least one of the corresponding shared resource control registers in response to the respective address so that the respective multi-bit value from a given said processor is stored to said at least one of the corresponding shared resource control registers.

19. The electronic circuit claimed in claim 15 wherein the shared resource includes a scalable supply voltage for said first set of processors.

20. The electronic circuit claimed in claim 15 further comprising plural sensor circuits providing respective errors and wherein said arbitrating circuit is operable to generate a minimum of the respective errors.

21. The electronic circuit claimed in claim 15 wherein said arbitrating circuit is operable to generate a sleep output for controlling the shared resource when all the processors in said first set of processors are asleep.

22. A telecommunication apparatus comprising:
a modem;
a first set of processors that use a first shared resource for operation of said first set of processors, the first shared resource having a plurality of resource levels, said modem coupled to at least one of said first set of processors;
a second set of processors that use a second shared resource for operation of said second set of processors, the second shared resource having a plurality of resource levels;
a set of shared resource control registers coupled to said first set of processors and to said second set of processors, at least two of said shared resource control registers operable to store respective multi-bit values representing respectively requested levels among the plurality of resource levels, said first set of processors each operable to supply a respective multi-bit value to at least one of the corresponding shared resource control registers and said second set of processors each operable to supply a respective multi-bit value to at least one of the corresponding shared resource control registers;
an arbitrating circuit coupled to said shared resource control registers and responsive to output a first multi-bit value representing an arbitrated first resource level of the first shared resource to said first set of processors and to output a second multi-bit value representing an arbitrated second resource level of the second shared resource to said second set of processors;
a scalable resource controller responsive to said arbitrating circuit to deliver the first shared resource to the first set of processors at substantially the arbitrated resource level of the first shared resource represented by the first multi-bit value output from said arbitrating circuit and to deliver the second shared resource to the second set of processors at substantially the arbitrated resource level of the second shared resource represented by the second multi-bit value output from said arbitrating circuit; and
a user interface coupled to said modem and to at least one of said processors in either said first set of processors or said second set of processors; and
circuitry for providing a first frequency level to a first processor in said first set of processors and at a same time providing a second frequency level for a second processor in said first set of processors, wherein the first frequency level is less than the second frequency level.

23. A process of manufacturing an electronic circuit comprising fabricating a first set of processors and a second set of processors coupled to respective resource control registers responsive to multi-bit resource requests from said first and second set of processors together with an arbitrating circuit responsive to said resource control registers to output a multi-bit value representing an arbitrated first resource level to each processor in the first set of processors and to output a multi-bit value representing an arbitrated second resource level to each processor in the second set of processors, wherein the first resource level is operable to be different than the second resource level and for providing a first frequency level to a first processor in said first set of processors and at a same time providing a second frequency level for a second processor in said first set of processors, wherein the first frequency level is less than the second frequency level.

24. The process of manufacturing claimed in claim 23 further including testing power management for the electronic circuit by supplying a controllable voltage for the first and second sets of processors, operating each processor to make respective voltage requests as the multi-bit resource requests, and arbitrating the voltage requests to automatically control the controllable voltage to establish a highest magnitude of the respective voltage requests from the first set of processors as the first resource level and to establish a highest magnitude of the respective voltage requests from the second set of processors as the second resource level.

* * * * *